(12) United States Patent
Emtman et al.

(10) Patent No.: US 8,142,050 B2
(45) Date of Patent: Mar. 27, 2012

(54) PHOSPHOR WHEEL CONFIGURATION FOR HIGH INTENSITY POINT SOURCE

(75) Inventors: Casey Edward Emtman, Kirkland, WA (US); Paul Gerard Gladnick, Seattle, WA (US); Scott Allen Harsila, Bothell, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 0 days.

(21) Appl. No.: 12/943,860

(22) Filed: Nov. 10, 2010

(65) Prior Publication Data

US 2011/0317396 A1 Dec. 29, 2011

Related U.S. Application Data

(63) Continuation-in-part of application No. 12/823,050, filed on Jun. 24, 2010.

(51) Int. Cl.
*F21V 9/00* (2006.01)
*G01N 21/00* (2006.01)

(52) U.S. Cl. .......... 362/231; 362/84; 362/284; 356/609; 356/237.1

(58) Field of Classification Search ................. 362/231, 362/84, 284; 356/601, 609, 237.1–237.4, 356/401; 313/501–504
See application file for complete search history.

(56) References Cited

U.S. PATENT DOCUMENTS

| | | | |
|---|---|---|---|
| 3,916,690 A * | 11/1975 | Brandli | 374/129 |
| 4,995,727 A * | 2/1991 | Kawagoe et al. | 356/402 |
| 6,066,861 A | 5/2000 | Höhn et al. | |
| 6,255,670 B1 | 7/2001 | Srivastava | |
| 6,417,019 B1 | 7/2002 | Mueller | |
| 6,641,448 B2 | 11/2003 | Wang | |
| 6,765,237 B1 | 7/2004 | Doxsee | |
| 6,835,112 B2 | 12/2004 | Tanabe | |
| 7,026,755 B2 | 4/2006 | Setlur | |
| 7,083,490 B2 | 8/2006 | Mueller | |
| 7,088,038 B2 | 8/2006 | Srivastava | |
| 7,112,921 B2 | 9/2006 | Menkara | |

(Continued)

FOREIGN PATENT DOCUMENTS

EP 2 169 964 A2 3/2010

(Continued)

OTHER PUBLICATIONS

European Search Report mailed Dec. 3, 2010, in EP Application No. 10 16 0735, filed Apr. 22, 2010, 2 pages.

(Continued)

*Primary Examiner* — Ali Alavi
(74) *Attorney, Agent, or Firm* — Christensen O'Connor Johnson Kindness PLLC

(57) ABSTRACT

A phosphor point source element comprises a substrate and light emitting phosphor particles arranged on the substrate to provide a circular operational track having a tightly packed particle arrangement adjacent to a flat operational surface of an operational track region. The operational track region is rotated while illuminated at a point to provide a high intensity point source. The tightly packed particle arrangement may be achieved by spinning the phosphor particles in a cavity to compress the phosphor on the substrate at the periphery of the cavity, or by other mechanical compression. The tightly packed phosphor arrangement may either be compressed against a forming element that bounds the cavity, or machined, to provide a flat operational surface. An adhesive binding agent that permeates the phosphor particles may be cured to fix the tightly packed arrangement. A window element may support and/or protect the operational surface, in some embodiments.

19 Claims, 14 Drawing Sheets

U.S. PATENT DOCUMENTS

| | | |
|---|---|---|
| 7,235,792 B2 | 6/2007 | Elofson |
| 7,279,832 B2 | 10/2007 | Thurk |
| 7,354,785 B2 | 4/2008 | Kabay |
| 7,547,114 B2 * | 6/2009 | Li et al. ............ 362/231 |
| 7,554,665 B2 * | 6/2009 | Wadman ............ 356/446 |
| 2003/0015643 A1 * | 1/2003 | Veith et al. ............ 250/205 |
| 2005/0105565 A1 | 5/2005 | Tobiason |
| 2005/0208302 A1 | 9/2005 | Yi |
| 2005/0255629 A1 | 11/2005 | Han |
| 2006/0097621 A1 | 5/2006 | Park |
| 2006/0109483 A1 | 5/2006 | Marx |
| 2006/0282137 A1 | 12/2006 | Nightingale |
| 2007/0019408 A1 | 1/2007 | McGuire, Jr. |
| 2009/0015157 A1 | 1/2009 | Sun |
| 2009/0034284 A1 | 2/2009 | Li |
| 2009/0284148 A1 | 11/2009 | Iwanaga |
| 2010/0001256 A1 | 1/2010 | Coe-Sullivan |
| 2010/0079730 A1 | 4/2010 | Shibasaki |
| 2010/0097779 A1 | 4/2010 | Gladnick |

FOREIGN PATENT DOCUMENTS

| | | |
|---|---|---|
| WO | 2006/133214 A2 | 12/2006 |
| WO | 2009/017992 A1 | 2/2009 |

OTHER PUBLICATIONS

"Green Slim Projector XJ-A2551A250," Casio International, © 2010 Casio Computer Co., Ltd., Tokyo, <http://www.casio-intl.com/projector/xj_a255_250/> [retrieved May 26, 2010], 6 pages.

Gosnell, J.D., et al., "Cadmium Selenide Nanocrystals as White-Light Phosphors," Sixth International Conference on Solid State Lighting, San Diego, Aug. 14, 2006, Proceedings of SPIE [Society of Photographic Instrumentation Engineers] 6337:63370A-1-63370A-9, Sep. 2006.

Happek, U., "Development of Efficient UV-LED Phosphor Coatings of Energy Saving Solid State Lighting," Final Report, DE-FC26-04NT41956, University of Georgia Department of Physics and Astronomy, Athens, Georgia, Jan. 2007.

* cited by examiner

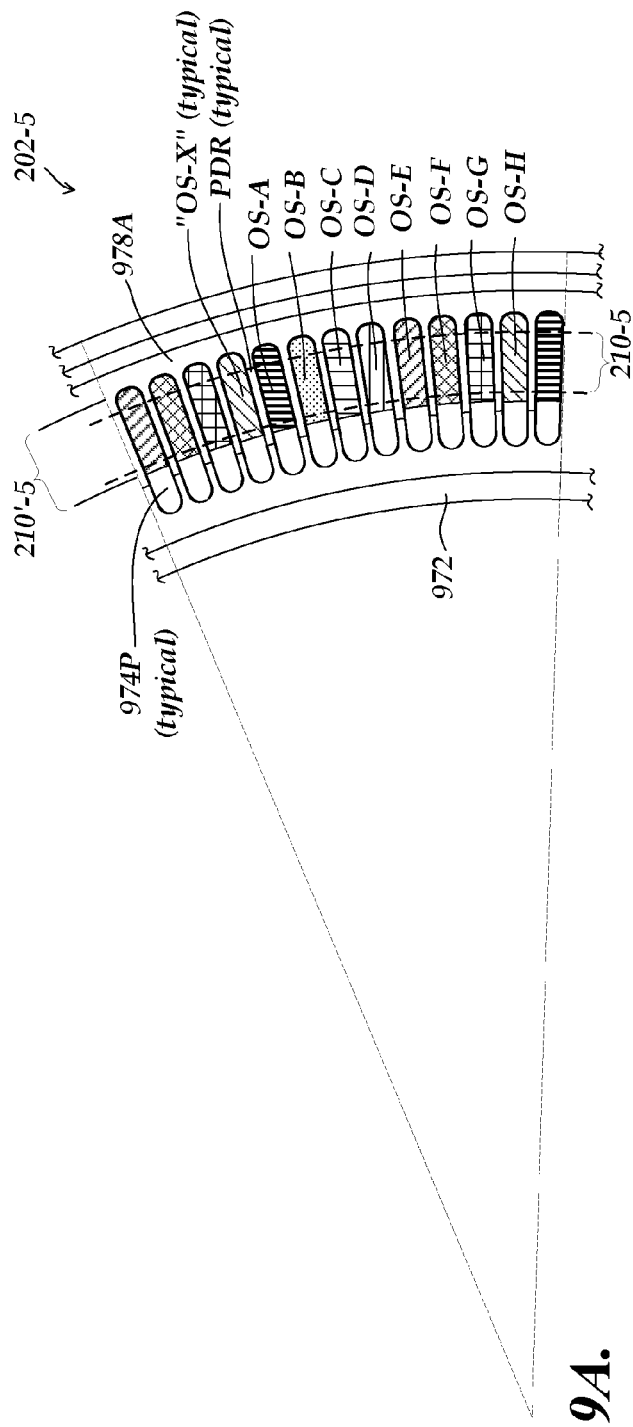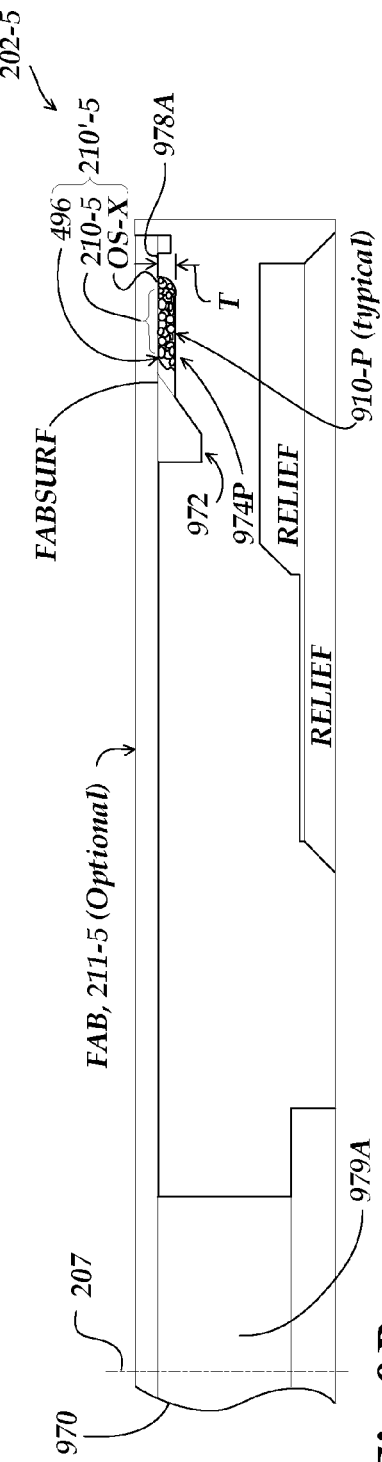
Fig. 9A.
Fig. 9B.

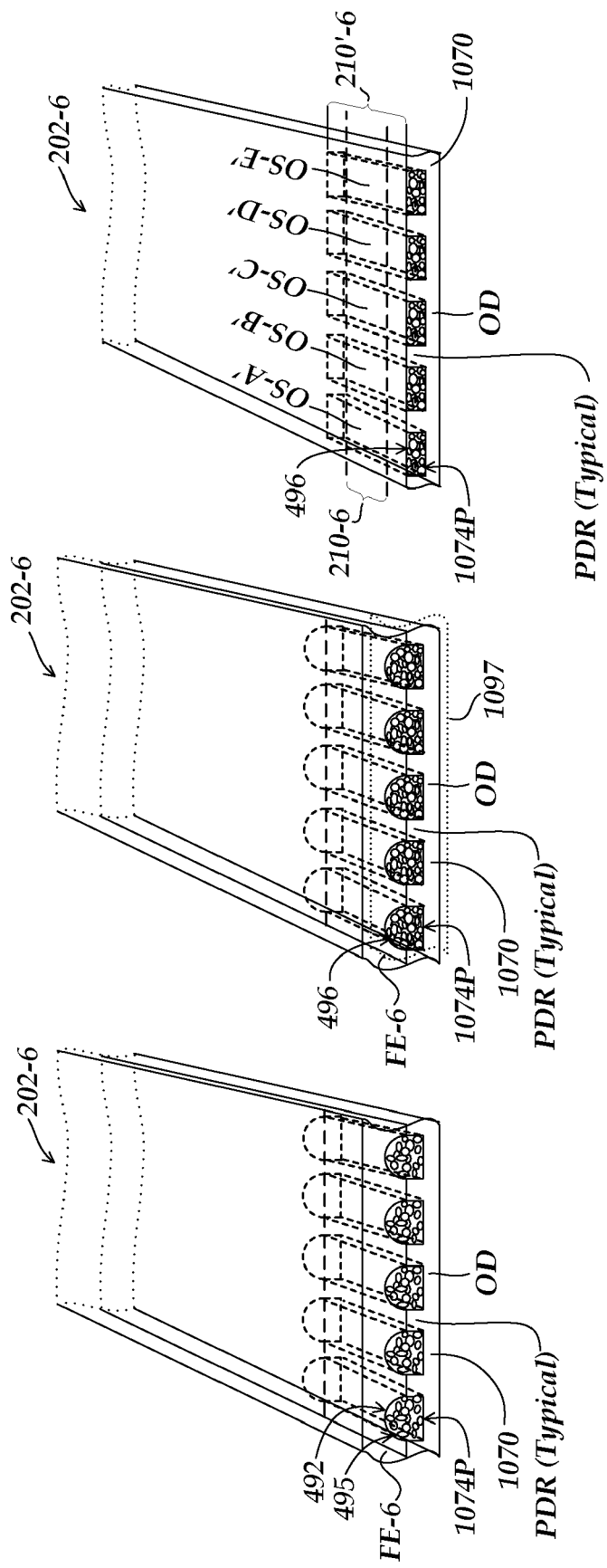

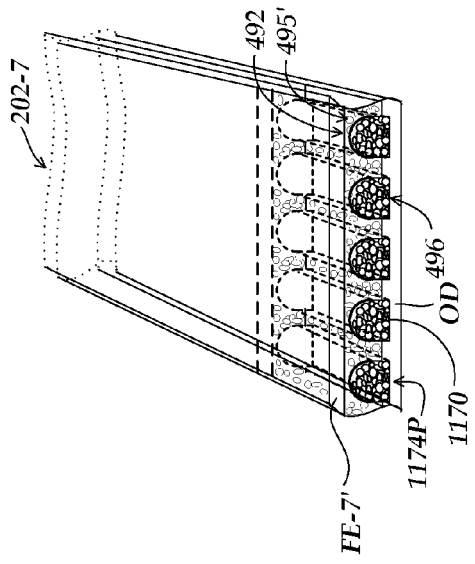
*Fig.11B.*
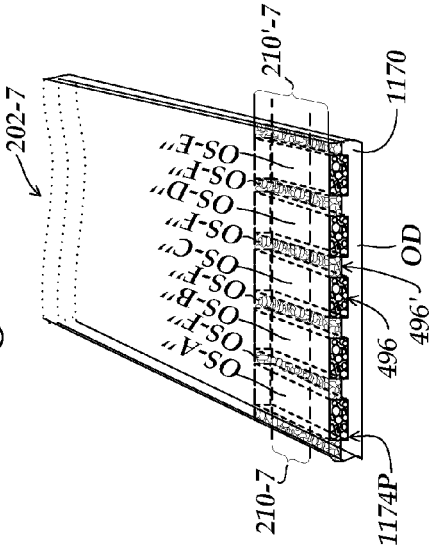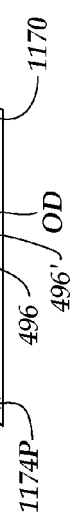
*Fig.11D.*
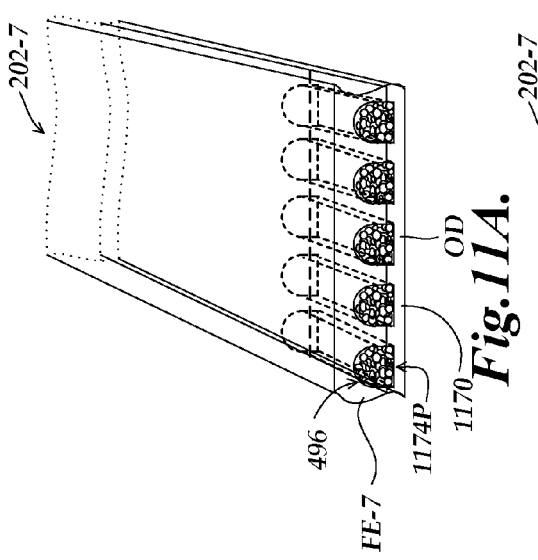
*Fig.11A.*
*Fig.11C.*

PHOSPHOR WHEEL CONFIGURATION FOR HIGH INTENSITY POINT SOURCE

CROSS-REFERENCE(S) TO RELATED APPLICATION(S)

This application is a continuation-in-part of U.S. patent application Ser. No. 12/823,050, filed Jun. 24, 2010, priority from the filing date of which is hereby claimed under 35 U.S.C. §120. The key content of U.S. patent application Ser. No. 12/823,050 is included herein, and it is otherwise incorporated herein by reference in its entirety.

FIELD OF THE INVENTION

The invention relates generally to light sources, and more particularly to high-intensity light sources suitable for use in precision measurement instruments, such as chromatic point sensors.

BACKGROUND OF THE INVENTION

Various uses are known for high-intensity broadband light sources. For example, it is known to use such light sources with chromatic confocal techniques in optical height sensors. In such an optical height sensor, as described in U.S. Patent Application Publication No. 2006/0109483 A1, which is incorporated herein by reference in its entirety, an optical element having axial chromatic aberration, also referred to as axial or longitudinal chromatic dispersion, may be used to focus a broadband light source such that the axial distance to the focus varies with the wavelength. Thus, only one wavelength will be precisely focused on a surface, and the surface height or position relative to the focusing element determines which wavelength is best focused. Upon reflection from the surface, the light is refocused onto a small detector aperture, such as a pinhole or the end of an optical fiber. Upon reflection from a surface and passing back through the optical system to the in/out fiber, only the wavelength that is well focused on the surface is well focused on the fiber. All of the other wavelengths are poorly focused on the fiber, and so will not couple power efficiently into the fiber. Therefore, for the light returned through the fiber, the signal level will be greatest for the wavelength corresponding to the surface height or position of the surface. A spectrometer type detector measures the signal level for each wavelength in order to determine the surface height.

Certain manufacturers refer to practical and compact systems that operate as described above, and that are suitable for chromatic confocal ranging in an industrial setting, as chromatic point sensors (CPS). A compact chromatically dispersive optical assembly that is used with such systems is referred to as an "optical pen." The optical pen is connected through the optical fiber to an electronic portion of the CPS, which transmits light through the fiber to be output from the optical pen and provides the spectrometer that detects and analyzes the returned light.

In known implementations, a continuous wave Xenon arc lamp is typically used as a high intensity broadband (e.g., white) light source for a CPS having the measurement rate on the order of 30 kHz. A Xenon arc lamp provides broadband light emission that covers the spectral range, and hence the height measurement range, of a CPS. It is also a high intensity light source with sufficient energy for obtaining a good S/N ratio at the measurement rate of about 30 kHz and the readout time of about 33 μs ($=\frac{1}{30}\times10^{-3}$). However, in practical applications, a Xenon arc lamp exhibits certain undesirable characteristics, such as a less than desirable lifetime and arc spatial stability. A spatially stable, long lifetime light source is desirable in order to minimize any variation in CPS calibration due to changes in the light source spectral emission with arc movement, and also to minimize the downtime of a CPS. Further, many manufactured workpieces include hybrid materials, which have different reflectance characteristics and thus are saturated at different brightnesses. Thus, a CPS light source can preferably be brightness modulated (e.g., from less to more brightness) at a rate equal to or greater than the CPS measurement rate (e.g., 30 kHz) to allow measurement of hybrid materials. Such high rate light modulation is not practical with known Xenon arc lamps. Similar light source deficiencies are also found in association with other instrument applications, such as spectrometers, and the like.

U.S. Patent Application Publication No. 2010/0097779 A1 (the '779 Publication), which is commonly assigned and hereby incorporated herein by reference in its entirety, discloses a high intensity light source wherein a light emitting phosphor or the like is distributed on a movable member, which is moved continuously through a fixed illuminated spot and emitted light output coupling region. The disclosed configurations are superior to Xenon light sources in many respects, and are particularly suitable as high intensity light sources that have a long operating life, that provide high modulation rates, and that efficiently and economically couple light into an optical fiber, among other advantages. Thus, such light sources are well suited for CPS systems such as that outlined above, for example. However, '779 Publication does not disclose customized design parameters and/or compatible fabrication methods for applying light emitting phosphor or the like to the movable member, such that the operating characteristics of the light sources are optimized. Thus, design parameters and fabrication methods customized to enhance the operating characteristics of the light sources disclosed in the '779 Publication, or the like, would be desirable.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

It has been found that prior art design parameters and/or fabrication methods do not provide fully optimized operating characteristics for the light sources disclosed in the '779 Publication, or the like. In particular, the stability of the intensity and/or wavelength from one light pulse to the next may show minor variations, which are less than desirable in some applications. Such minor variations may be related to minute characteristics of the light emitting phosphor structure on the movable substrate. Certain design parameters and/or fabrication methods disclosed herein may be used to provide a phosphor point source element comprising an improved light emitting phosphor structure on a movable substrate, which may be used in a light source configuration to economically reduce such variations to a practical minimum.

In various embodiments, a phosphor point source element is provided that is rotated to provide a high intensity point source of phosphor radiation from an operational track on the phosphor point source element. The phosphor point source element may be utilized in a light source configuration with a long operating life and which in certain embodiments can support a modulation rate that is equal to or greater than a typical measurement rate of a CPS or other precision measurement instrument. In one embodiment, the phosphor point source element comprises a substrate and a light emitting phosphor supported by the substrate, and arranged in a circular operational track region on the substrate that rotates about a central axis, so as to form a "wheel" type configuration. In various embodiments, the light emitting phosphor comprises phosphor particles; the operational track region comprises an operational surface that can be illuminated to excite the light emitting phosphor; the phosphor particles in the operational track region are arranged in a tightly packed particle arrangement fixed in position adjacent to the operational surface; and the operational surface comprises a surface of the tightly packed particle arrangement, and is formed such that it is nominally flat, wherein the tightly packed particle arrangement is substantially similar to a packing arrangement that would be provided by forcing the phosphor particles against one another in the vicinity of the operational track region.

It will be appreciated that the flatness of the light emitting phosphor at the operational surface is beneficial, particularly in implementations for precision measurement instruments. For example, when the phosphor point source element is utilized as part of a chromatic point sensor system, it is desirable that the operational surface be flat, so that as it is spun, the phosphor particles tightly packed against the operational surface remain at a stable distance within the depth of field (DOF) of the optical system which is used to gather light from the operational track region. In one specific example embodiment, the depth of field of an optical system used to gather light into a 50 um fiber may be approximately 20 um. Thus, in one specific example embodiment, the stability of the light source from one light pulse to the next (e.g., the intensity and/or wavelength stability) may be enhanced when the operational surface flatness is on the order of 20 microns or less, which may be on the order of the particle size of the light emitting phosphor particles in some embodiments.

In other embodiments, the optical system used to gather light may have a larger depth of field, or may be an optical fiber that does not have a conventional depth of field. Nevertheless, in general, the more stable the distance from the operational surface to the optical system, the more efficient and stable will be the coupling of optical power into and/or out of the operational track region. The light source configurations, design parameters, and fabrication methods disclosed herein are customized to provide such a stable distance in a precise and economical manner.

In some embodiments, the operational track region may comprise a binding agent that is interspersed with the phosphor particles and binds them to one another and to the substrate. In one embodiment, the binding agent may comprise a low viscosity adhesive binding agent (e.g., UV or two-part curing adhesive) that can be allowed to cure while the phosphor powder is compressed in the tightly packed particle arrangement. The utilization of the binding agent prevents the phosphor from shifting, and can allow a window or other element that maintains the powder in place during fabrication to be removed so as to shorten the optical path length, and reduce mass.

In some embodiments, the operational surface comprises a machined surface of the tightly packed particle arrangement. In other embodiments, the operational surface comprises a molded surface of the tightly packed particle arrangement.

In some embodiments, the operational track region has a nominal thickness dimension T defined between the operational surface and the substrate, the phosphor particles in the operational track region each have a maximum dimension, the average maximum dimension in the operational track region is D, and the nominal thickness dimension T is at least N*D, where N has a specified minimum value (e.g., 2, 4, etc.), T has a specified minimum value (e.g., 100 microns), and the average maximum dimension has a specified maximum value (e.g., 35 microns, 50 microns, etc.). In some embodiments, the dimension T may be limited to 70 microns or less. An operational track region conforming to these parameters may provide advantageous levels of intensity and/or wavelength stability in some embodiments.

In some embodiments, the operational surface is flat such that the operational surface fits between ideal parallel planes spaced not more than a dimension F apart (e.g., 50 microns, 150 microns, etc.).

In some embodiments, the operational track region comprises a plurality of phosphor sub-regions arranged along the operational track region, the phosphor particles comprise a plurality of chemically distinct types of phosphor particles and in adjacent first and second sub-regions, a first composition ratio comprising one or more of the chemically distinct types of phosphor particles may be provided in the first sub-region, a second composition ratio comprising one or more of the chemically distinct types of phosphor particles is provided in the second sub-region, and the first and second composition ratios are different. In some embodiments, the operational surface is interrupted by pocket dividing regions between the phosphor sub-regions, and comprises operational surface portions corresponding to the phosphor holding sub-regions. Alternatively, in some embodiments the operational surface comprises a continuum of phosphor sub-regions and operational surface portions corresponding to the phosphor sub-regions.

In some embodiments, the phosphor point source element further comprises a window element that includes a planar surface, wherein the window element is arranged in a fixed relationship relative to the substrate such that the planar surface is arranged at a desired location of the operational surface.

In some embodiments, the phosphor point source element is fabricated by a method that begins by providing a substrate and at least one cavity arranged along a circular operational track region of the phosphor point source element, the cavity bounded by a forming element and the substrate, and comprising at least one forming wall. In one embodiment, the substrate may comprise a metal disk that has circular reservoirs for receiving phosphor powder (and a binding agent if one is used). The forming element may comprise a clear glass window, or a metal plate, etc. The phosphor particles (and a binding agent if one is used) are then positioned in the cavity. In certain embodiments, this may comprise placing the phosphor particles (and binding agent if one is used) in one or more circular reservoirs in the substrate. The phosphor particles (and a binding agent if one is used) are then forced or compressed against the at least one forming wall of the cavity to provide a tightly packed particle arrangement in the vicinity of the operational track region. The phosphor particles are fixed in the tightly packed particle arrangement and the tightly packed particle arrangement is formed such that it has a nominally flat operational surface along the operational track in the operational track region. In one embodiment, the technique for achieving the desired compression involves the use of reactive centrifugal force, wherein forcing the phosphor particles against the forming wall comprises utilizing forces created by spinning the substrate, the forming element, and the phosphor particles, wherein the spinning forces the phosphor particles against the at least one forming wall and provides forces sufficient to achieve the tightly packed particle arrangement. The substrate is spun at a sufficient rate (e.g., 1,000-40,000 rpm) so as to cause the desired tightly packed particle arrangement. In other embodiments, a mechanical compression technique may be utilized. If a liquid binding agent has been utilized during the process, the liquid binding agent may then be allowed to harden. Following this process, the forming element may either be left in place (in some embodiments), or may be removed (in other embodiments) so as to reduce the mass of the movable member and/or to shorten the optical path length between the operational track region and the optical system which is used to gather light from the operational track region. In some embodiments, shortening this optical path length provides certain advantages described in greater detail below. In some embodiments, forming the tightly packed particle arrangement such that it has a nominally flat operational surface comprises machining the operational surface such that it is nominally flat. Alternatively, in other embodiments, forming the tightly packed particle arrangement such that it has a nominally flat operational surface comprises molding the tightly packed particle arrangement against a flat forming wall, and then fixing the phosphor particles in the tightly packed particle arrangement, such that the corresponding molded surface provides the nominally flat operational surface.

In some embodiments, in operation an input light source (e.g., a laser) provides a high-intensity input light to an illuminated spot located in the operational track region of the phosphor point source element to thereby cause the light-emitting phosphor to emit high-intensity output light from an excited phosphor spot or track included in an emitted light output coupling region in the operational track region. In various embodiments, the emitted light output coupling region is located proximate to the illuminated spot. At the same time, with the operation of a movable member actuator, the operational track region and light-emitting phosphor region(s) continuously moves relative to the illuminated spot (e.g., rotates through the location of the illuminated spot) so as to thereby avoid quenching from high photon flux in the emitted light output coupling region (if applicable) and also to extend the life of the phosphor region(s) and hence the overall operating life of the light source configuration. It will be understood that optical quenching and/or photobleaching and/or lifetime considerations may depend on the basic phosphor light emitter and/or related additives and/or the binder or encapsulant characteristics associated with the phosphor material in various embodiments. In some embodiments, the light source can also be modulated at a rate equal to or greater than a typical measurement rate of a CPS or other precision measurement instrument.

It should be appreciated that various embodiments of the invention provide a particularly compact and economical means for coupling high intensity light into the end of an optical fiber. This is particularly valuable in applications (e.g., CPS applications, collimated light projectors, and the like) that benefit from a high intensity "ideal point source," in that the output end of the optical fiber may provide an economical point source that is nearly ideal (that is, it has a very small dimension) for many applications. In addition, the invention provides a light source with a very stable intensity output level and/or wavelength despite the motion of the substrate and the operational track region including the light emitting phosphor. Furthermore, various embodiments are able to provide various wavelength spectra with improved versatility and economy compared to known methods for providing various spectra from a point source.

In some embodiments, the light-emitting phosphor may comprise one or more (e.g., a mixture) of conventional phosphor materials such as YAG-Ce+-based phosphors, or photoluminescent semiconductor nanoparticles or nanocrystals, or Q-particle phosphors (commonly called quantum dots or semiconductor quantum dots), or zinc oxide nanorods, or the like. Thus, it should be appreciated that the term "light-emitting phosphor" is used generically herein, to refer to these and other any suitable light emitting materials which may be configured and used according to the principles disclosed herein.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 9A and 9B are diagrams of top and side cross-section views illustrating pockets of different types of phosphor particles in a fifth embodiment of a phosphor point source element;

FIGS. 10A, 10B and 10C are perspective diagrams illustrating how phosphor is arranged in a tightly packed particle arrangement in a sixth embodiment of a phosphor point source element;

FIGS. 11A, 11B, 11C and 11D are perspective diagrams illustrating how phosphor is arranged in a tightly packed particle arrangement in a seventh embodiment of a phosphor point source element;

DETAILED DESCRIPTION OF THE PREFERRED EMBODIMENTS

Figure 1:
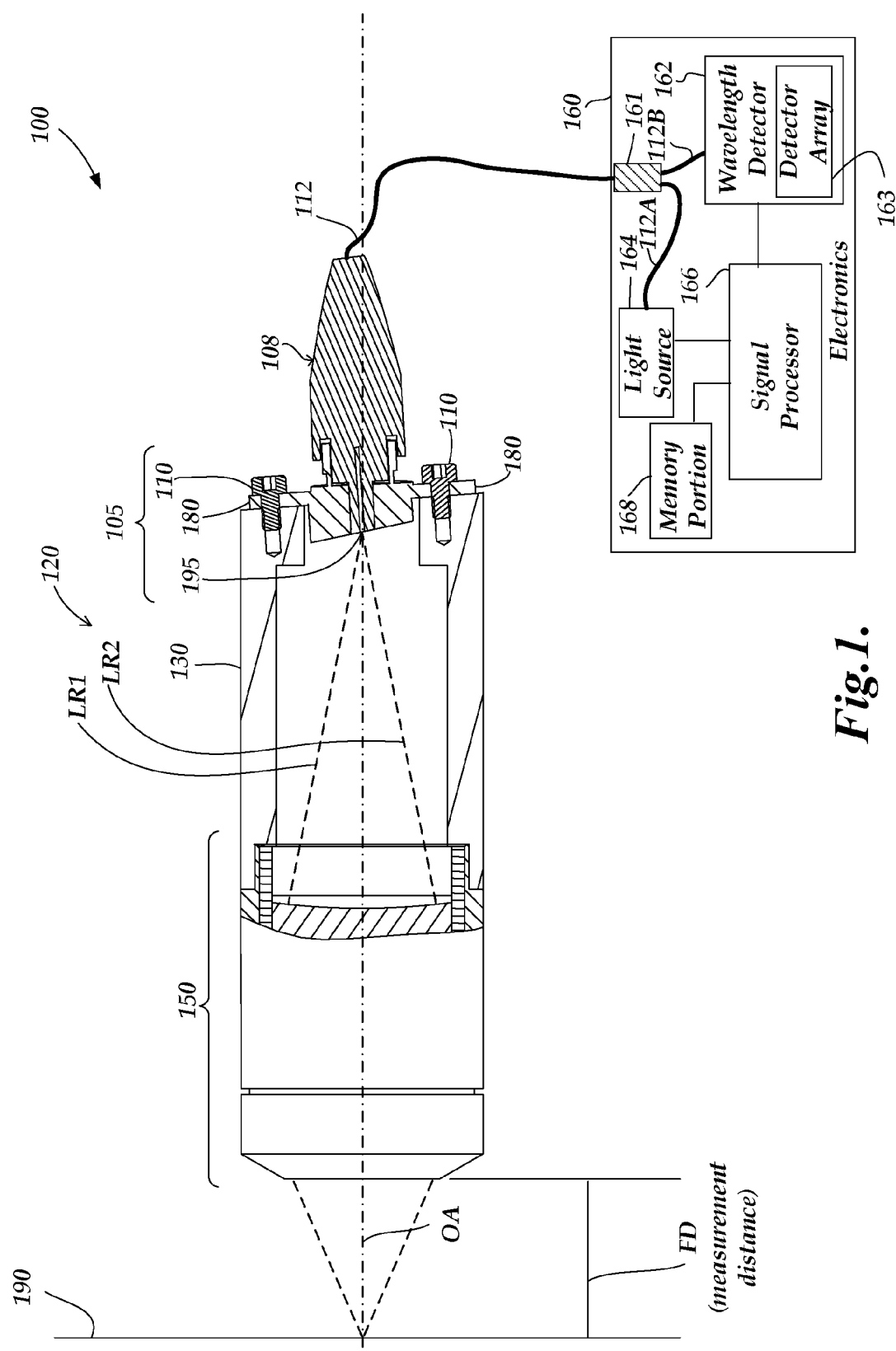
FIG. 1 is a block diagram of an exemplary chromatic point sensor in which a light source using a phosphor point source element formed in accordance with the invention may be utilized.

To provide context to the present invention, the following description of FIG. 1 generally illustrates how a light source using a phosphor point source element according to various exemplary embodiments disclosed herein may be utilized in a chromatic point sensor (CPS) system. It should be appreciated that CPS systems are expensive, high-performance measurement systems that benefit from a light source that is compatible with fiber optic illumination. The performance and value of CPS systems may be enhanced by higher sample rates (e.g., using short bursts of high-intensity illumination), and more repeatable intensity levels and illumination wavelength spectra. Generally speaking, a light source that can provide a measurable improvement in any of these factors can also provide a measurable improvement in the performance and value of the host CPS system. Thus, even small light source improvements may be valued. It should be apparent to those skilled in the art, however, that such an improved light source may be applied to advantage in various other systems as well, such as other precision measurement instruments (e.g., spectrometers, etc.) or the like.

FIG. 1 is a block diagram of an exemplary chromatic point sensor 100. As shown in FIG. 1, the chromatic point sensor 100 includes an optical pen 120 and an electronics portion 160. The optical pen 120 includes an in/out fiber optic sub-assembly 105, a housing 130, and an optics portion 150. The in/out fiber optic sub-assembly 105 includes a mounting element 180, that may be attached to the end of the housing 130 using mounting screws 110. The in/out fiber optic sub-assembly 105 receives an in/out optical fiber (not shown) through a fiber optic cable 112 which encases it, and through a fiber optic connector 108. The in/out optical fiber may be a multi-mode fiber (MMF) with a core diameter of about 50 microns. The in/out optical fiber outputs an output beam through an aperture 195, and receives reflected measurement signal light through the aperture 195.

In operation, light emitted from the fiber end through the aperture 195 is focused by the optics portion 150, which includes a lens that provides an axial chromatic dispersion such that the focal point along the optical axis OA is at different distances depending on the wavelength of the light, as is known for chromatic confocal sensor systems. The light is focused on a workpiece surface 190. Upon reflection from the workpiece surface 190, the reflected light is refocused by the optics portion 150 onto the aperture 195 as illustrated by the limiting rays LR1 and LR2. Due to the axial chromatic dispersion, only one wavelength will have the focus distance FD that matches the measurement distance from the optical pen 100 to the surface 190. The wavelength that is best focused at the surface 190 will also be the wavelength of the reflected light that is best focused at the aperture 195. The aperture 195 spatially filters the reflected light such that predominantly the best focused wavelength passes through the aperture 195 and into the core of the optical fiber cable 112. The optical fiber cable 112 routes the reflected signal light to a wavelength detector 162 that is utilized for determining the wavelength having the dominant intensity, which corresponds to the measurement distance to the workpiece surface 190.

The electronics portion 160 includes a fiber coupler 161, an optical fiber 112B between the fiber coupler 161 and the wavelength detector 162, an optical fiber 112A between the fiber coupler 161 and a light source 164, a signal processor 166 and a memory portion 168. The wavelength detector 162 includes a spectrometer arrangement wherein a dispersive element (e.g., a grating) receives the reflected light through the optical fiber cable 112, the optical coupler 161 and optical fiber 112B and transmits the resulting spectral intensity profile to a detector array 163.

The light source 164, which is controlled by the signal processor 166, is coupled to the optical fiber 112A and through the optical coupler 161 (e.g., a 2×1 optical coupler) to the fiber cable 112. As described above, the light travels through the optical pen 120 which produces longitudinal chromatic aberration so that its focal length changes with the wavelength of the light. The wavelength of light that is most efficiently transmitted back through the fiber is the wavelength that is in focus on the surface 190. The reflected wavelength-dependent light intensity then passes through the fiber coupler 161 again so that approximately 50% of the light is directed to the wavelength detector 162, which receives the spectral intensity profile distributed over an array of pixels along a measuring axis of the detector array 163, and operates to provide corresponding profile data. The measurement distance to the surface is determined via a distance calibration lookup table which is stored in the memory portion 168. The light source 164 may comprise a phosphor-based high intensity light source using, for example, one of the phosphor point source elements described in more detail below. It should be appreciated that such phosphor point source elements are particularly well-suited to economically coupling stable high intensity light into the end of an optical fiber in a small space, as explained in greater detail below. Thus, such phosphor point source elements are not only novel within themselves, they may also particularly enhance the economy and utility of host systems that convey a light source to a workpiece through an optical path that includes optical fibers, such as CPS systems, certain spectrometer systems, and the like.

Figure 2:
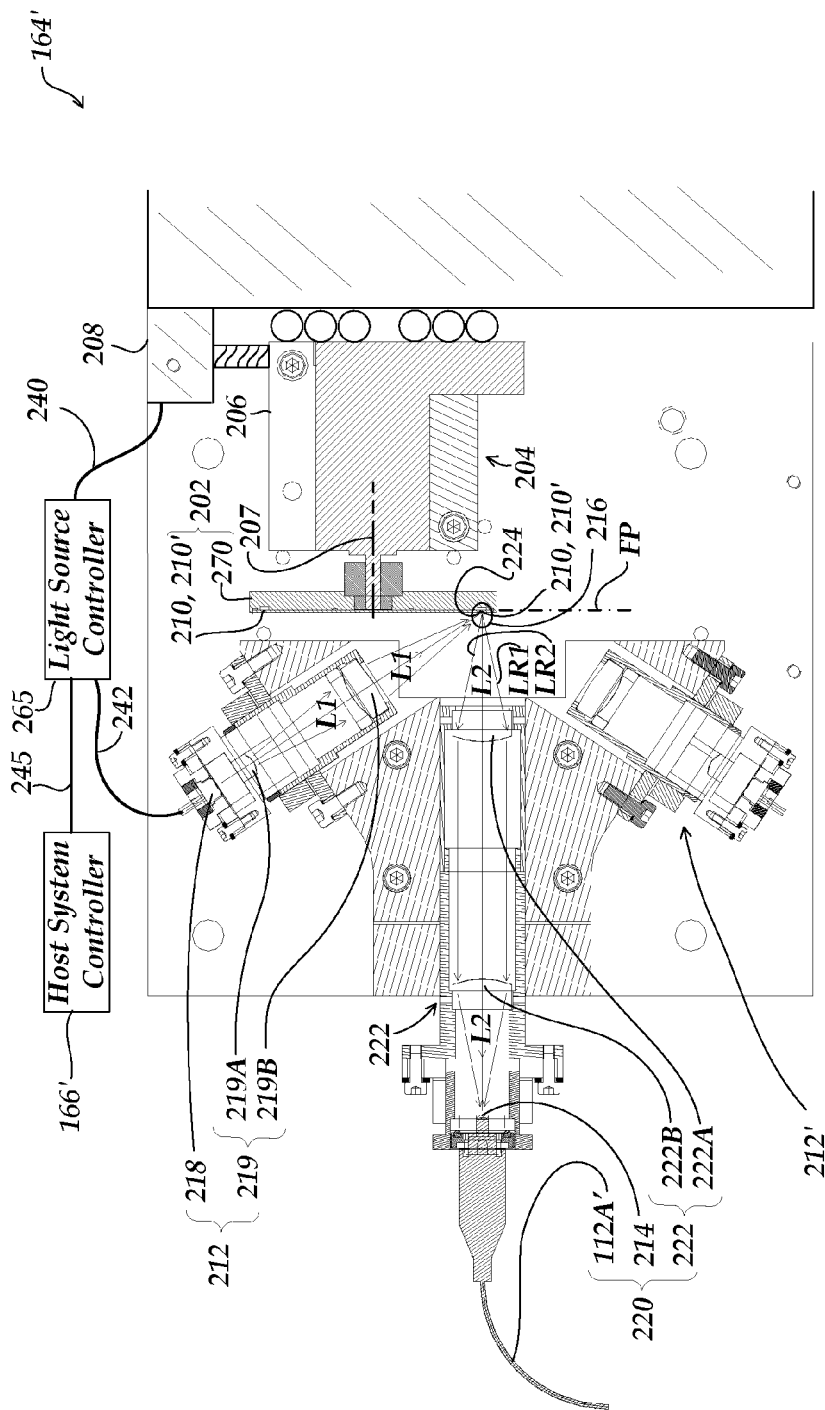
FIG. 2 is a plan cross-section diagram of a light source including a phosphor point source element formed according to the invention.

FIG. 2 is a plan cross-section view showing a light source configuration 164' including a phosphor point source element 202 formed according to the invention. The light source configuration 164' may be used in various applications, for example, as the light source 164 illustrated in FIG. 1. Accordingly, the light source 164' may be coupled to a host system controller 166' (e.g., a CPS controller/signal processor) through a signal line(s) 245 and optically coupled to a host system light application (e.g., an optical pen) through an optical fiber 112A' (e.g., the optical fiber 112A and/or 112 shown in FIG. 1). Certain aspects of how light sources utilizing a phosphor point source element operate and may be coupled to such systems are described in more detail in the previously incorporated '779 Publication.

As shown in FIG. 2, the light source configuration 164' includes the phosphor point source element 202 mounted to a movable member actuator 204 comprising a rotary actuator 206 (e.g., a miniature precision rotary motor), which may optionally be mounted to a linear actuator 208 (e.g., a miniature precision linear motor or motor and lead screw). In the illustrated embodiment, the phosphor point source element 202 comprises a substrate 270, and a phosphor region 210' that includes an operational track region 210. The phosphor point source element 202 is rotated around an axis 207 that extends generally perpendicular to a surface of the operational track region 210 of the phosphor point source element 202 in the illustrated embodiment. In some embodiments, the phosphor point source element 202 may have a diameter on the order or 10-75 millimeters, or more, and may be rotated at up to 40,000 RPM, or more. In some embodiments, the phosphor point source element 202 may include a window element (not shown), such as the window element 211-1 outlined below with reference to FIG. 3.

In the embodiment shown in FIG. 2, the light source configuration 164' also includes at least a first input light source 212, an output path optical element set 220, and a light source controller 265 operably connected to the linear actuator 208 through power and/or signal line(s) 240, the rotary actuator 206 through a power and/or signal line(s) 241, and the first input light source 212 through power and/or signal line(s) 242. The first input light source 212 provides or generates an input light L1 which illuminates the operational track region 210 of the phosphor point source element 202 at an illuminated spot 224, as described in greater detail below. As the name implies, the operational track region 210 is a track that is actually illuminated by the input light L1 and actually emits an output light L2. The operational track region 210 may comprise some or approximately all of a broader light-emitting phosphor region (or composition) 210', in various embodiments.

In some embodiments, the light-emitting phosphor region 210' may comprise a light emitting phosphor, or the like, of a type suitable for producing narrow band light. In some embodiments, the light-emitting phosphor region 210' may comprise light emitting phosphors, or the like, of a suitable type or types that are blended for producing broadband light (e.g., 400-700 nm, which may be useful in a CPS system application). For example, the phosphor blend may include a combination of a blue-emitting phosphor, a green-emitting phosphor and/or a red-emitting phosphor. Phosphor blends of a suitable type for producing broadband light are disclosed in U.S. Pat. Nos. 6,255,670; 6,765,237; 7,026,755; and 7,088,038, which are incorporated herein by reference. These patents describe phosphor blends in intimate or proximate contact with continuous-wave UV LED to output broadband light. Alternatively or additionally, phosphor blends of a suitable type for producing broadband light are disclosed in U.S. Pat. Nos. 6,066,861; 6,417,019; and 6,641,448, which are incorporated herein by reference. These patents describe YAG-Ce+-based phosphor blends that absorb continuous blue LED light and output broadband light. Alternatively or additionally, phosphor blends of a suitable type for producing broadband light may include differently sized photoluminescent semiconductor nanoparticles such as disclosed in U.S. Pat. No. 7,279,832, or nanocrystalline materials such as disclosed in U.S. Pat. No. 7,235,792, or semiconductor nanocrystals such as disclosed in U.S. Pat. No. 7,083,490, each of which is hereby incorporated herein by reference in their entirety (later referred to as the '832 patent, the '792 patent, and the '490 patent, respectively). Alternatively or additionally, phosphor blends of a suitable type for producing broadband light may include nanostructures based on zinc oxide nanorods such as disclosed in U.S. Patent Application Publication No. 20050255629 which discloses zinc oxide nanorods exhibiting photoluminescent properties, and in U.S. Patent Application Publication No. 20050208302, which discloses zinc oxide nanorods as a nano-material for a nano-material/phosphor hetero-structure in a white light source (referred to as the '629 Publication and the '302 Publication, respectively).

To briefly outline the basic operation of the light source 164', the first input light source 212 generates an input light L1 which illuminates the operational track region 210 of the phosphor point source element 202 at an illuminated spot 224. The illuminated spot 224 is fixed relative to an emitted light output coupling region 216. The light source controller 265 operates the rotary actuator 206 to provide at least one speed (e.g., 2.5 m/s, 10 m/s, or even 50 m/s or more, in various embodiments and/or applications) of the operational track region 210 across the illuminated spot 224, in order to reduce optical quenching and minimize photo-bleaching as described in the incorporated '779 Publication, along the operational track region 210. The light-emitting phosphor of the operational track region 210 located proximate to the illuminated spot 224 emits light into the emitted light output coupling region 216. Specifically, the active light-emitting portion of the operational track region 210 absorbs the input light L1 having a first wavelength (or wavelength range), and emits output light L2 having a second wavelength range different from the first wavelength. In some embodiments, an emitted light output coupling region may be defined as the region that produces emitted light that is actually coupled into the end of an output optical fiber (e.g., the output light L2 that is coupled into the fiber end 214). In various other embodiments where the emitted light is output to an undefined element that is included in a host system or the like, an emitted light output coupling region may be defined to be coextensive with an excited phosphor spot surrounding the illuminated spot 224. In any case, output light L2 in the emitted light output coupling region 216 is input to the output light path optical element set 220 (e.g., including the fiber end 214 and the optical fiber 112A'), and may be provided as illumination to a host system.

In the embodiment shown in FIG. 2, the input light source 212 comprises a light generator 218 which can be controlled to provide short high intensity pulses as outlined in the incorporated '779 Publication (e.g., a laser light source, such as a 500 mW or 1 W violet diode laser which may be pulsed at a KHz or MHz rate) and an input light path optical element set 219 comprising the input lenses 219A and 219B, which may provide a tightly focused illuminated spot 224, which allows the resulting localized output light L2 to be efficiently coupled into the fiber end 214. For example, in some embodiments, a surface of the operational track region 210 may be located approximately at a focal plane FP of the input light path optical element set 219, and the resulting illuminated spot 224 may have a diameter on the order of 5-10 microns, or in other embodiments the illuminated spot 224 may have a diameter on the order of 100-150 microns. In some embodiments, the light-emitting operational track region 210 may emit light from an excited phosphor spot that is larger than and surrounds the illuminated spot 224 (e.g., with an excited spot diameter of 150 microns).

In the embodiment shown in FIG. 2, the output light path optical element set 220 includes an optical fiber 112A' including a fiber end 214, and a collection optics 222 comprising the lenses 222A and 222B. However, in some embodiments such as those disclosed in the incorporated '779 Publication, the collection optics 222 may be omitted, and the fiber end 214 may be mounted in close proximity to the light-emitting operational track region 210 and the emitted light output coupling region 216 (e.g., within 100-300 um, in some embodiments), in order to directly receive the output light L2. When the output light path optical element set 220 includes the collection optics 222, the focal plane FP which may be a focal plane FP of the elements of the input light path optical element set 219, or a focal plane FP of the collection optics 222, or both. As described in greater detail below with reference to FIG. 14B, for points on the surface of a phosphor particle that are not proximate to the focal plane FP, some of the light emitted within an angular range corresponding the acceptance angle of the collection optics 222 will not be input and/or transmitted through the output light path optical element set 220 because it falls outside of the limiting rays LR1 and LR2 of the output light path optical element set 220. Thus, the proportion of light that is actually output from a point on a phosphor particle through a focused output light path optical element set 220 depends on the distance of that point from the focal plane FP. Accordingly, an "uneven" phosphor surface in the operational track region 210 (e.g., as fabricated by prior art methods, such as shown in FIG. 14B) would contribute to significant output intensity variations as it moves in a light source that uses a focused output light path optical element set 220, such as that shown in FIG. 2. Furthermore, if the light source includes an input light path optical element set 219 that is also focused at the focal plane FP, the size and average intensity within the resulting illuminated spot 224 in the operational track region 210 will vary depending on the distance of the phosphor surface in the operational track region 210 from the focal plane FP, which may also contribute to output intensity variations in "uneven" phosphor surfaces (e.g., as fabricated by prior art methods).

Thus, in accordance with various embodiments disclosed and claimed herein, a flat operational surface OS of a tightly packed phosphor particle arrangement 496 is achieved in the operational track region 210. Such a flat operational surface of tightly packed particles allows the surface to be rotated through the illuminated spot 224 without significant changes in the distance between a succession of excited phosphor particles and a focal plane FP of the input and/or output optical path. Thus, in contrast to phosphor elements fabricated by previously known methods, a phosphor point source element 202 having a flat operational surface OS in the operational track region 210, as disclosed and claimed herein, may provide a more stable output intensity when used in a light source such as that shown in FIG. 2, and may also enhance the output stability of other light source embodiments that may use a moving phosphor point source element, such as the light source embodiments disclosed in the incorporated '779 Publication, even those configured with simple "optical fiber only" input and output light paths that do not have a defined focal plane.

Regarding various optional features shown in FIG. 2, in some embodiments a second input light source 212' may be included to increase the light intensity that can be provided by the light source 164'. The second input light source 212' may be configured and controlled similarly to the first light source 212. In other embodiments, additional analogous input light sources may be added, if desired. As previously noted, the linear actuator 208 is also optional in some embodiments. When the movable member actuator 204 includes the linear actuator 208, the rotary actuator 206 is configured and controlled to rotate the phosphor point source element 202 while the linear actuator 208 is configured and controlled to linearly displace the phosphor point source element 202 relative to the illuminated spot 224, for example, radially inward to provide a fresh operational track region 210 in the light-emitting phosphor region 210' should one track become reduced in efficiency or otherwise damaged. More generally, using the linear actuator 208 and the rotary actuator 206 in combination, the illuminated spot 224 may traverse an operational track region 210 of the light-emitting phosphor region 210' along a generally circular and/or spiral path, between an outer and inner edge of the operational track region 210 and/or the light-emitting phosphor region 210'. As will be described in more detail below, the width of the usable operational track region 210 of the phosphor region 210' may be determined in part by the process that is used to form the operational track region 210 and the phosphor region 210'. In some embodiments, the linear actuator 208 may be omitted, and a single operational track region 210 may be used along the phosphor region 210'. In any case, relative motion of the operational track region 210 relative to the illuminated spot 224 allows the operational track region 210 to generate high intensity light in a sustained manner, to thereby support high intensity strobe cycles (e.g., with an exposure time on the order of 50 μs, or 33 μs, or less) over a long lifetime, as outlined in the incorporated '779 Publication.

Figure 3:
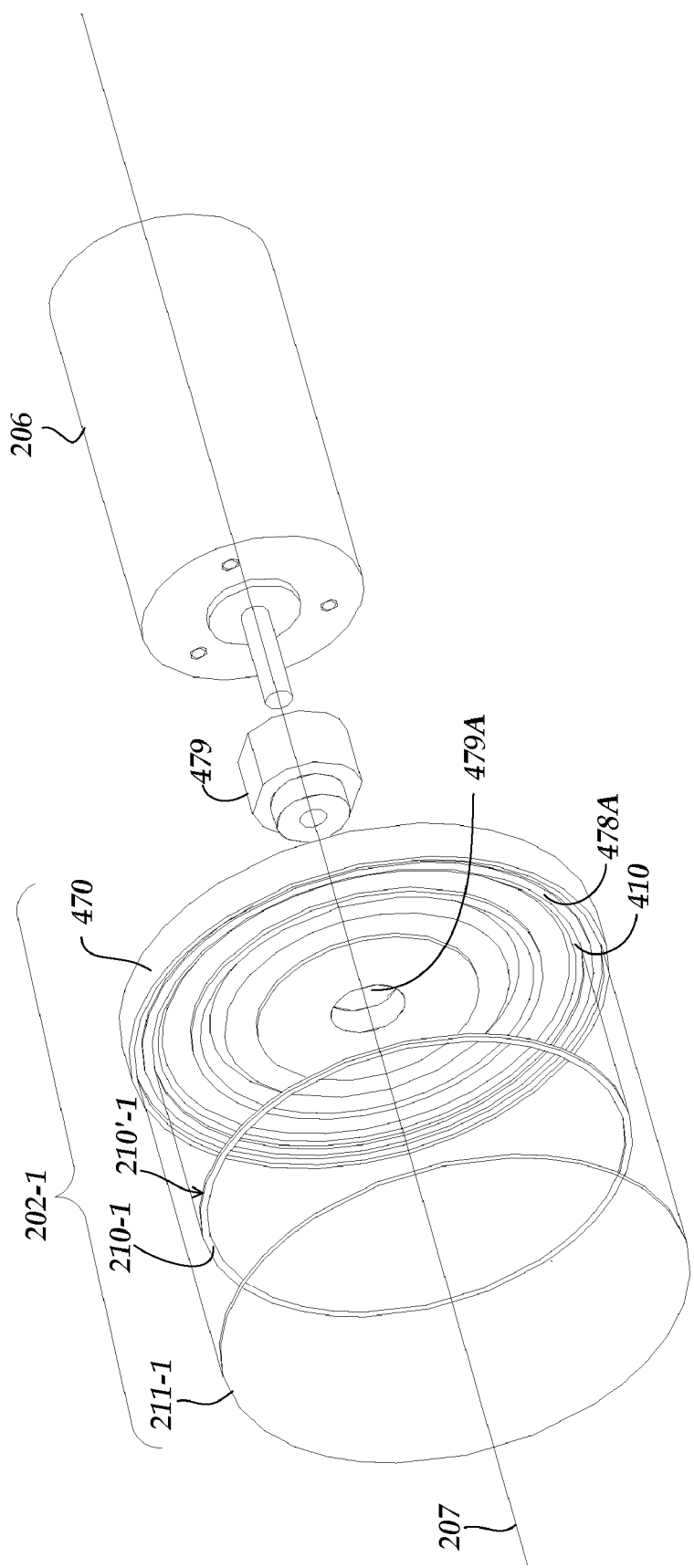
FIG. 3 is an exploded diagram of the rotary actuator and a first embodiment of the phosphor point source element of FIG. 2.

FIG. 3 is an exploded diagram of the rotary actuator 206 and a first embodiment of a phosphor point source element 202-1 usable in place of the generic phosphor point source element 202 shown in FIG. 2. As shown in FIG. 3, the phosphor point source element 202-1 comprises a substrate 470, a phosphor region 210'-1 which includes an operational track region 210-1, and a transparent window element 211-1. The window element 211-1 is preferably as light and thin as is practical in some embodiments (e.g., it may have a thickness on the order of 500 um or less, in some embodiments), provided that the overall flatness of the window element 211-1 may be maintained in a manner consistent with the needs of various embodiments outlined below. The window element 211-1 may provide protection and/or support for the phosphor region 210'-1 in some embodiments. However, in other embodiments, it is advantageous to omit the window element 211-1, such that an input and/or output optical fiber end can be positioned proximate to the operational track region 210-1 (e.g., as described in light source embodiments disclosed in the incorporated '779 Publication). More generally, it should be appreciated that provided that in embodiments where a phosphor region 210' is otherwise supported by an adhesive binder or the like, any of the window elements shown in such embodiments herein may be omitted.

The substrate 470 may include a fabrication plate shoulder 478A and phosphor track support shoulder 410 and a mounting hole 479A, as well as other features described below with reference to FIGS. 4A-4C and FIGS. 5A-5B. FIG. 3 also shows a mounting hub 479, which may engage the mounting hole 479A and/or an adjacent shoulder of the substrate 470 for mounting the phosphor point source element 202-1 onto the rotary actuator 206. However, in other embodiments, the substrate 470 may include features that allow it to be mounted directly to the rotary actuator 206. It should be appreciated that although the phosphor region 210'-1 and the operational track region 210-1 appear to be freestanding elements in FIG. 3, they may be fabricated as described in greater detail below, and may not have the mechanical strength or integrity to stand apart from the substrate 470, in various embodiments. In some embodiments the phosphor region 210'-1 and the operational track region 210-1 may be formed and supported by the phosphor track support shoulder 410, as described in greater detail below. After assembly and/or fabrication, the phosphor region 210'-1 may abut and/or be bonded to the phosphor track support shoulder 410, and the operational track region 210-1 may abut the transparent window element 211-1, which may abut and be supported by the fabrication plate shoulder 478A. As described above, the assembled phosphor point source element 202-1 rotates around an axis of rotation 207. The elements and fabrication of the phosphor point source element 202-1 are described in greater detail below with reference to FIGS. 4A-4C and FIGS. 5A-5B.

Figures 4A, 4B, 4C:
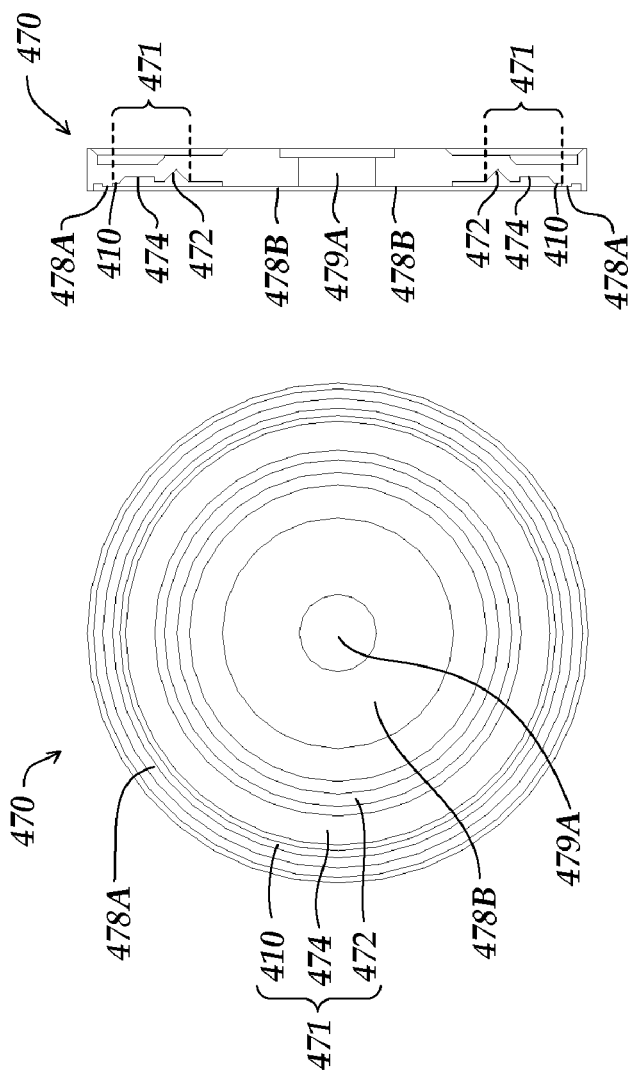
FIGS. 4A-4C are diagrams of front, side cross-section and back views of the substrate of the phosphor point source element shown in FIG. 3.

FIGS. 4A-4C are diagrams of front, side cross-section and back views of the substrate 470 shown in the FIG. 3. As best illustrated in FIGS. 4A and 4B, the substrate 470 includes fabrication plate shoulders 478A and 478B which may define a plane for locating a forming element such as a fabrication plate as described further below, and/or a window element (e.g., the window element 211-1, shown in FIG. 3), and a reservoir area 471. More specifically, within the reservoir area 471, circular grooves and/or shoulders are provided at a recess from the plane of the fabrication plate shoulders 478A and 478B, including an adhesive binding agent reservoir 472, a phosphor reservoir 474, and a phosphor track support shoulder 410, as shown and described in more detail below with respect to FIGS. 5A and 5B. Since it may be rotated at high speed in some applications, it may be advantageous if the substrate 470 is as light and balanced as is practical. Therefore, the back of the substrate 470 may have as much material removed as possible (e.g., in the areas RELIEF) in some embodiments, provided that the overall flatness of the substrate 470 may be maintained, particularly in the area of the fabrication plate shoulders 478A and 478B and the phosphor track support shoulder 410, during and after fabrication, as outlined below with reference to FIGS. 5A and 5B.

Figure 5A:
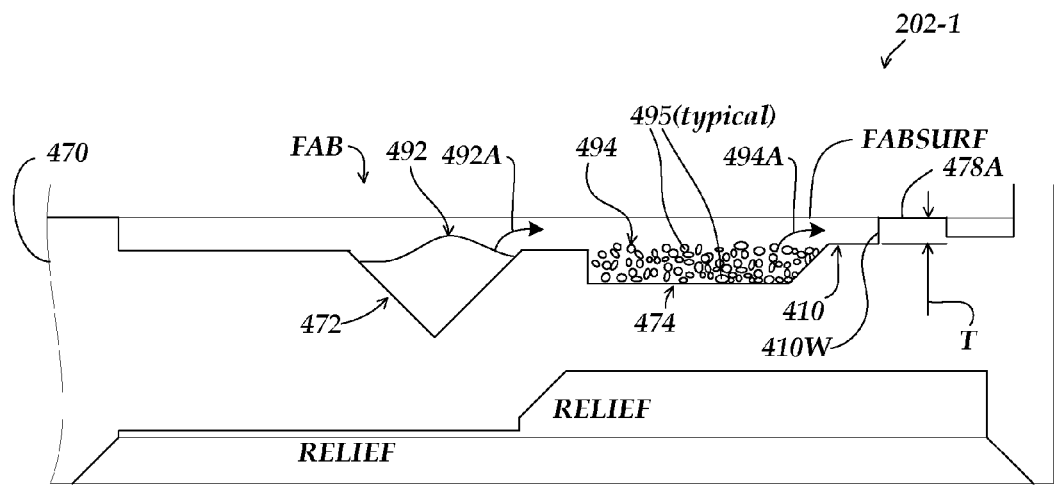
FIGS. 5A and 5B are cross-section diagrams illustrating how the phosphor is arranged in a tightly packed particle arrangement in the phosphor point source element of FIG. 3.
Figure 5B:
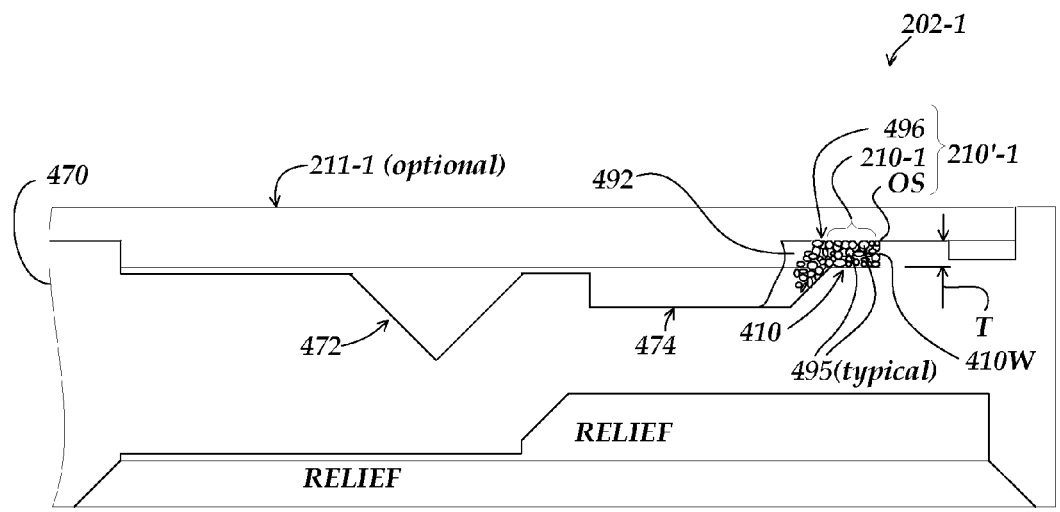

FIGS. 5A and 5B are cross-section diagrams illustrating the reservoir area 471 of the substrate 470 shown in FIGS. 4A-4C—comprising the binding agent reservoir 472, the phosphor reservoir 474, and the phosphor track support shoulder 410, and showing how the operational track region 210-1 may be formed to provide the phosphor point source element 202-1 shown in FIG. 3. As will be described in more detail below, FIG. 5A illustrates the placement of a phosphor 494 and an adhesive binding agent 492 in their respective reservoirs, and placement of a forming element such as a fabrication plate FAB, in preparation for fabricating the operational track region 210-1, while FIG. 5B illustrates the results of fabrication after a technique has been applied to form a flat, tightly packed, phosphor particle arrangement in the operational track region 210-1.

As shown in FIG. 5A, as one step in fabrication an adhesive binding agent 492 may be placed in the adhesive binding agent reservoir 472, and a phosphor 494 is placed in the phosphor reservoir 474. The phosphor 494 may comprise individual phosphor particles 495 of any suitable light emitting material (e.g., true phosphors, or nanoparticles, or the like) and individual phosphor particles 495 may have various sizes, although in some embodiments it is advantageous if the phosphor particles 495 have a controlled maximum dimension (e.g., as provided by filtering the particles through a sized mesh, or the like). In general, the adhesive binding agent reservoir 472 and the phosphor reservoir 474 may have any convenient size and shape. However, in some embodiments it is desirable for each to have a volume approximately corresponding to a desired fabrication volume of the material that it is intended to hold.

As another step in fabrication, a flat smooth surface FABSURF of the fabrication plate FAB may be positioned against the flat fabrication plate shoulder 478A (and the fabrication plate shoulder 478B, if it is included on the substrate 470), and clamped or bonded in that position during fabrication. In this position, the surface FABSURF is nominally flat, and provides a closed cavity including space above the adhesive binding agent 492, the phosphor 494, and the phosphor track support shoulder 410. As shown for this configuration in FIG. 5A, proximate to the phosphor track support shoulder 410 the cavity has a thickness dimension T corresponding to the distance that the phosphor track support shoulder 410 is recessed from the surface of fabrication plate shoulder 478A, and a side of the fabrication plate shoulder 478A may provide an outer wall 410W.

As another step in fabrication, with the elements shown in FIG. 5A configured as outlined above, the substrate 470 may be spun around its central axis (e.g., the rotation axis 207, shown in FIG. 3) at a high speed. As a result, the adhesive binding agent 492 and the phosphor 494 flow towards the phosphor track support shoulder 410, as indicated by the arrows 492A and 494A, respectively. In the specific example embodiment that is illustrated, the adhesive binding agent reservoir 472 and the phosphor reservoir 474 are shown to have sloped surfaces along their outer periphery, which may be advantageous in encouraging their contents to flow towards the phosphor track support shoulder 410. The spinning (and the reactive centrifugal force that results from the spinning) may be maintained until the phosphor particles 495 are tightly packed against the surface FABSURF and the outer wall 410W in the vicinity of the phosphor track support shoulder 410, approximately as shown in FIG. 5B. The spinning may also be maintained until the adhesive binding agent 492 permeates substantially all the spaces between the phosphor particles 495, and is cured interspersed with the particles 495 to bind them in place to one another and to the phosphor track support shoulder 410 and the outer wall 410W.

FIG. 5B shows that as a result of the fabrication steps outlined above, a phosphor region 210'-1 is formed including an operational track region 210-1 having the thickness dimension T, wherein the phosphor particles in the operational track region 210-1 are arranged in a tightly packed particle arrangement 496 that provides an operational surface OS. Because the operational surface OS was/is fabricated by forcing the phosphor particles 495 in the tightly packed particle arrangement 496 to conform to the surface FABSURF as outlined above, the operational surface OS conformed/conforms to the surface FABSURF and is nominally flat and smooth. If the surface FABSURF is not sufficiently flat and/or smooth to provide a desired flatness and/or smoothness of the operational surface OS, or if it simply provides a more convenient or reliable fabrication method, after a tightly packed particle arrangement is achieved in the vicinity of the operational track region the operational surface OS may be machined (e.g., turned, ground, or lapped, or the like) to provide a desired flatness and/or smoothness. Because the operational surface OS is machined as a surface after the tightly packed particle arrangement is achieved, adjacent to (e.g., interior to) the operational surface OS the tightly packed particle arrangement is substantially similar to a packing arrangement that would be provided by forcing the phosphor particles against one another in the vicinity of the operational track region.

In some embodiments, the fabrication plate FAB may be identical to the window element 211-1 previously described with reference to FIG. 3, and once the fabrication steps outlined above are completed, the fabrication plate FAB may remain and be bonded in place, in order to provide the optional window element 211-1 shown in FIG. 5B. In one alternative embodiment, when the window element 211-1 is used, the adhesive binding agent 492 may be omitted, and friction and/or the reactive centrifugal forces provided by rotation during normal operation of the device may maintain the desired tightly packed particle arrangement 496 and operational surface OS during operation. In other embodiments, the fabrication plate FAB may be a transparent or opaque plate, and may be removed once the adhesive binding agent is cured. In such embodiments, it may be desirable to initially utilize an adhesive bond inhibitor or release agent on the fabrication plate FAB, so as to simplify its removal.

As previously outlined, and as taught further below with reference to FIGS. 14A and 14B, a flat operational surface OS of a tightly packed particle arrangement 496 may be rotated through the illuminated spot 224 (shown in FIG. 2) without significant changes in the distance between a succession of excited phosphor particles 495 and a focal plane FP and/or aperture of the input and/or output optical path (e.g., significant changes in the distance may be on the order of 30-50 microns, or even less, in some applications). This provides a more stable output intensity when a phosphor point source element is used in a light source such as that shown in FIG. 2, or embodiments disclosed in the incorporated '779 Publication.

It will be appreciated that smaller phosphor particles 495 may fill the operating surface OS more densely and uniformly than larger particles, further enhancing the stability of the output intensity. Larger particles may be tolerated in some embodiments, provided that there are enough smaller particles to densely fill in around them. In some embodiments, the particles 495 (which are not generally round) may be characterized by their maximum dimension D. A desirable density of particles may be provided if the average maximum dimension D of the phosphor particles 495 is at most 100 microns at the operating surface in some embodiments, or at most 50 microns in other embodiments, or at most 35 microns in still other embodiments. In various embodiments, to insure that the operational track region uniformly absorbs and emits light, it may be desirable that its thickness dimension T is at least two times the average maximum dimension D, or more desirably at least four times the average maximum dimension D. In some embodiments, the dimension T may be limited to 70 microns or less. In some embodiments, the particles 495 may be characterized by the percentage of the volume that they occupy in the operational track region. When the particles 495 have a range of sizes, a density of particles 495 may be approximately 75% of the volume of the operational track region in some embodiments, or approximately 80% in other embodiments, or approximately 85% in still other embodiments. In some embodiments, it may be desirable for the dimension T to be at least 100 microns, such that both the particles 495 and/or the adhesive binding agent 492 may flow readily into the operational track region. However, it should be appreciated that the particular dimensions and design relationships outlined above are exemplary only, and not limiting.

In some embodiments the adhesive binding agent is advantageously a 2-part curing adhesive. In other embodiments it may be a UV or thermal curing binder, or other desirable material. In some embodiments, the adhesive binding agent may advantageously have a viscosity less that 1000 centipoise, or more advantageously less than 500 centipoise, or less than 200 centipoise, or even 100 centipoise or less, during the step where it flows prior to curing. However, provided that the binder is selected such that during fabrication it allows the particles to assume a tightly packed particle arrangement adjacent to the operational surface, and flows around the particles sufficiently to bind them in position in the desired tightly packed particle arrangement, the binding agent characteristics outlined above are exemplary only, and not limiting.

FIGS. 6A and 6B, FIGS. 7A and 7B, FIGS. 8A and 8B, and FIGS. 9A and 9B are analogous to FIGS. 5A and 5B, respectively. The same or similar elements as these in the previous figures are noted with reference numbers that are the same, or that have the same suffixes (that is, the numbers 9XX, 8XX, 7XX, 6XX, and 4XX with a matching XX suffix) may designate functionally similar or identical elements, and may be similarly understood. Therefore, only significant differences are noted in the descriptions of FIGS. 6A and 6B, 7A and 7B, 8A and 8B, and 9A and 9B.

Figure 6A:
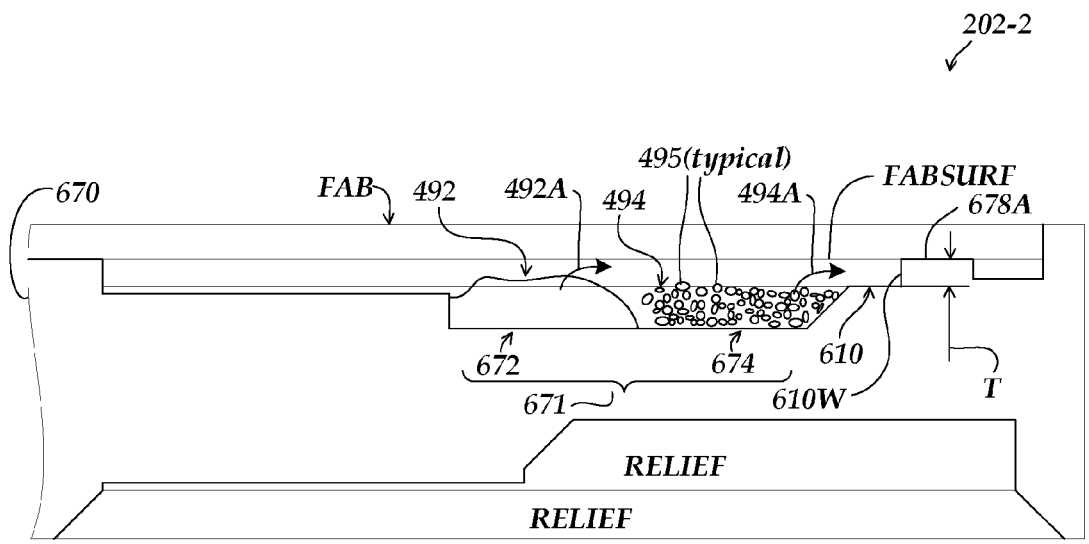
FIGS. 6A and 6B are cross-section diagrams illustrating how phosphor is arranged in a tightly packed particle arrangement in a second embodiment of a phosphor point source element.
Figure 6B:
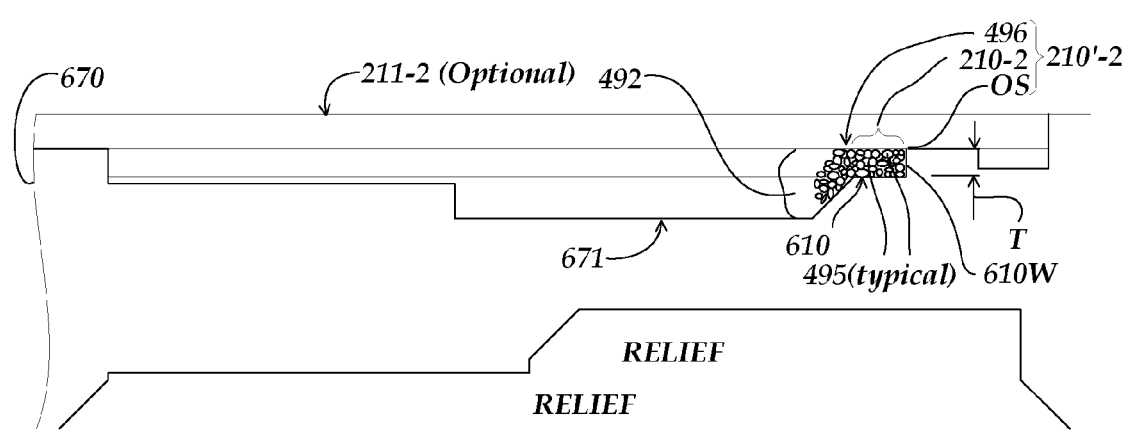

FIGS. 6A and 6B are cross-section diagrams illustrating how phosphor is arranged in a tightly packed particle arrangement in a second embodiment of a phosphor point source element 202-2. The phosphor point source element 202-2 of FIGS. 6A and 6B differs from the previously described phosphor point source element 202-1, in that instead of having an adhesive binding agent reservoir 672 that is separate from the phosphor reservoir 674, a combined reservoir 671 is used for holding both the adhesive binding agent 492 and the phosphor 494. Otherwise, the fabrication and features of the phosphor point source element 202-2 and its derivative alternative embodiments may be understood by analogy with the previous description of the phosphor point source element 202-1.

Figure 7A:
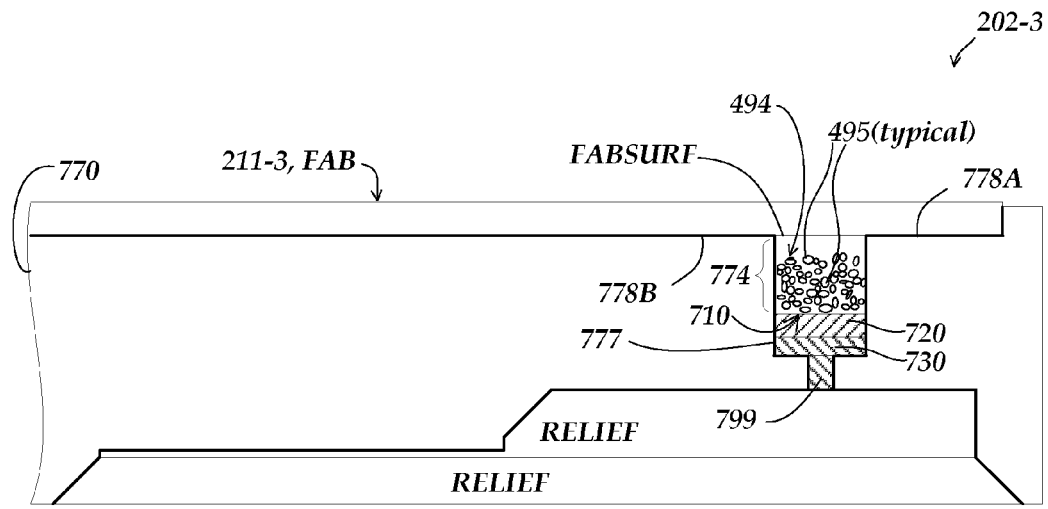
FIGS. 7A and 7B are cross-section diagrams illustrating how phosphor is arranged in a tightly packed particle arrangement in a third embodiment of a phosphor point source element.
Figure 7B:
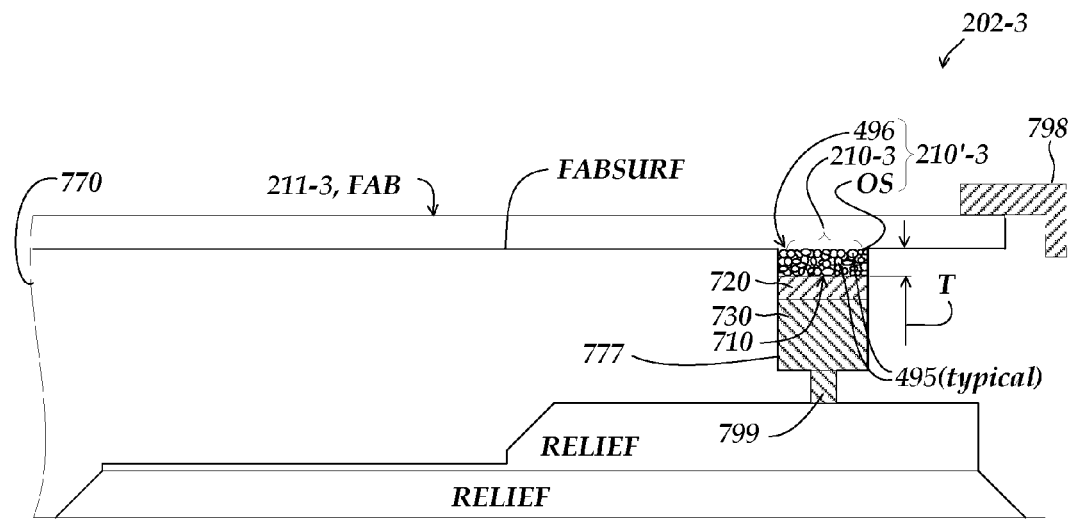

FIGS. 7A and 7B are cross-section diagrams illustrating how phosphor is arranged in a tightly packed particle arrangement in a third embodiment of a phosphor point source element 202-3. The phosphor point source element 202-3 of FIGS. 7A and 7B differs from the previously described phosphor point source element 202-1, in that the window element 211-3 is not optional, and rather than using reactive centrifugal force to create the tightly packed particle arrangement 496, a mechanical compression configuration is utilized. As illustrated in FIG. 7A, the substrate 770 includes an annular groove 777. An annular compression element 720 (e.g., a metal ring) fits snugly into the annular groove 777. A top surface of the annular compression element 720, along with the sides of the annular groove 777, forms the phosphor reservoir 774. The top surface of the annular compression element 720 also functions as a phosphor track support shoulder 710, as outlined below.

As one step in fabrication the phosphor 494 is placed in the phosphor reservoir 474. As another step in fabrication, the window element 211-3, which also acts as a fabrication plate FAB having the flat smooth surface FABSURF, is positioned with the surface FABSURF against the flat fabrication plate shoulders 778A and 778B, and clamped (e.g., by the clamping ring 798 shown in FIG. 7B) or bonded in that position during fabrication. As another step in fabrication, a compression force is provided on the bottom surface of the annular compression element 720 by a compression mechanism 730 (e.g., by a curable adhesive injected under pressure through hole(s) 799 into the bottom of the annular groove 777, in the embodiment shown in FIGS. 7A and 7B), such that the phosphor track support shoulder 710 provided by the annular compression element 720 is driven toward the surface FABSURF until the phosphor particles 495 are tightly packed against the surface FABSURF, the sides of the annular groove 777, and the phosphor track support shoulder 710, approximately as shown in FIG. 7B.

FIG. 7B shows that as a result of the fabrication steps outlined above, a phosphor region 210'-3 is formed including an operational track region 210-3 having the thickness dimension T, wherein the phosphor particles in the operational track region 210-3 are arranged in a tightly packed particle arrangement 496 that provides an operational surface OS. Because the operational surface OS was/is fabricated by forcing the phosphor particles 495 in the tightly packed particle arrangement 496 to conform to the surface FABSURF as outlined above, the operational surface OS conformed/conforms to the surface FABSURF and is nominally flat and smooth. The tightly packed particle arrangement 496 is maintained by fixing the phosphor track support shoulder 710 in position after fabrication, for example by maintaining the force provided by the compression mechanism 730 and/or by bonding the annular compression element 720 in position (e.g., by curing the adhesive injected through hole(s) 799 into the bottom of the annular groove 777 during fabrication, in the embodiment shown in FIGS. 7A and 7B).

Figure 8A:
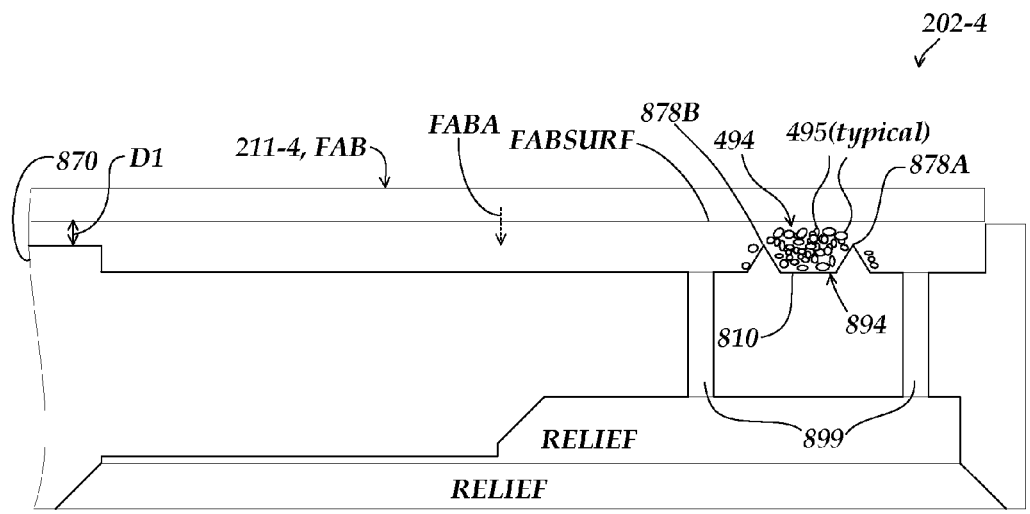
FIGS. 8A and 8B are cross-section diagrams illustrating how phosphor is arranged in a tightly packed particle arrangement in a fourth embodiment of a phosphor point source element.
Figure 8B:
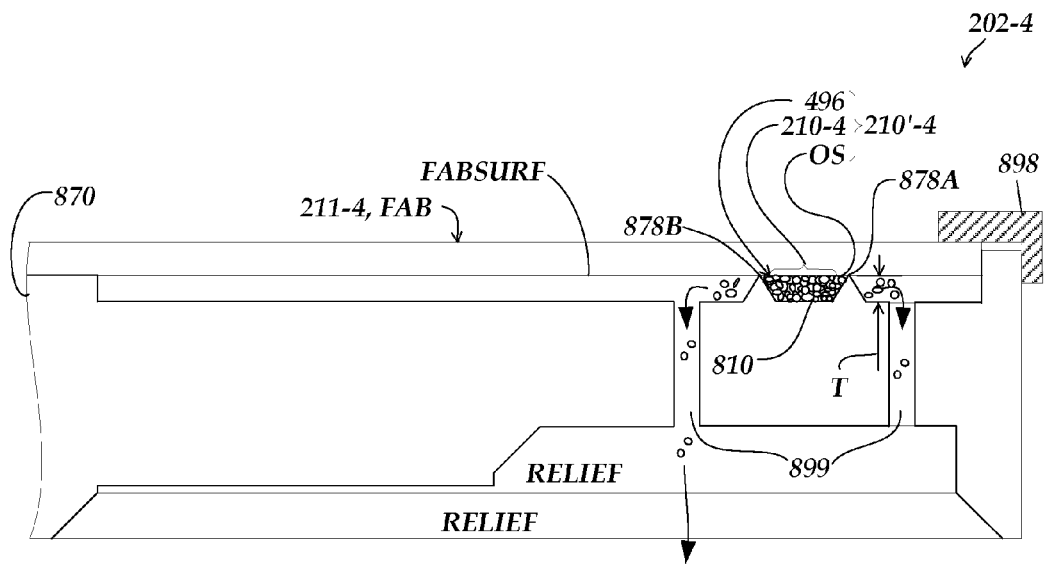

FIGS. 8A and 8B are cross-section diagrams illustrating how phosphor is arranged in a tightly packed particle arrangement in a fourth embodiment of a phosphor point source element 202-4. The phosphor point source element 202-4 of FIGS. 8A and 8B is similar to the phosphor point source element 202-3 and differs from the previously described phosphor point source element 202-1 in that the window element 211-4 is not optional, and to create the tightly packed particle arrangement 496, a mechanical compression configuration is utilized. As illustrated in FIG. 8A, the substrate 870 includes an annular groove 877, located between the peaks of surrounding annular ridges. The peaks of the annular ridges provide fabrication plate shoulders 878A and 878B in a flat plane. The annular groove 877 forms the phosphor reservoir 874, and a floor of the annular grove functions as a phosphor track support shoulder 810, as outlined below.

As one step in fabrication the phosphor 494 is placed to overfill the phosphor reservoir 874. As another step in fabrication, the window element 211-4, which also acts as a fabrication plate FAB having the flat smooth surface FABSURF, is lowered as indicated by the arrow FABA to compress the overfilled phosphor 494 (e.g., by pressuring and twisting the window element 211-4 against the overfilled phosphor 494) until it is positioned with the surface FABSURF against the fabrication plate shoulders 778A and 778B, and the phosphor particles 495 are tightly packed against the surface FABSURF, the sides of the annular groove 877, and the phosphor track support shoulder 810, approximately as shown in FIG. 8B. Then the window element 211-4 is clamped (e.g., by the clamping ring 898 shown in FIG. 8B) or bonded in that position to maintain the tightly packed particle arrangement 496. Residual or excess phosphor 494 that falls outside of the phosphor reservoir 874 may be vacuumed or flushed way through access holes 899.

FIG. 8B shows that as a result of the fabrication steps outlined above, a phosphor region 210'-4 is formed including an operational track region 210-4 having the thickness dimension T, wherein the phosphor particles in the operational track region 210-4 are arranged in a tightly packed particle arrangement 496 that provides an operational surface OS. Because the operational surface OS was/is fabricated by forcing the phosphor particles 495 in the tightly packed particle arrangement 496 to conform to the surface FABSURF as outlined above, the operational surface OS conformed/conforms to the surface FABSURF and is nominally flat and smooth.

FIGS. 9A and 9B are diagrams of top and side cross-section views illustrating how phosphor is arranged in a tightly packed particle arrangement 496 in pockets of different types of phosphor particles in a fifth embodiment of a phosphor point source element 202-5. FIG. 9A shows only an angular segment of the substrate 970. It will be understood that the features of the angular segment shown in FIG. 9A may continue, to extend 360 degrees to form the complete disk-shaped phosphor point source element 202-5. The phosphor point source element 202-5 of FIGS. 9A and 9B is similar to the phosphor point source element 202-1, but differs from the previously described phosphor point source element 202-1, in that the phosphor reservoir comprises individual phosphor reservoir pockets 974P, separated by radially extending pocket dividing regions PDR, and the individual phosphor reservoir pockets 974P may be individually loaded with different composition ratios of distinct types of phosphor particles fabricated to provide individual operational surface portions "OS-X" arranged along the circular operational track region 210-5. The different composition ratios of phosphor particles allow an individual operational surface portion "OS-X" (e.g., OS-B, etc.) corresponding to an individual phosphor reservoir pocket to output a distinct wavelength or a distinct combination of wavelengths and/or wavelength intensities in comparison to a neighboring operational surface portion (e.g., OS-C, etc.).

Similar to the phosphor point source element 202-1, as one step in fabrication an adhesive binding agent (e.g., adhesive binding agent 492) may be placed in the adhesive binding agent reservoir 972, a first composition ratio "A" of the distinct types of phosphor particles may be placed in a first phosphor reservoir pocket 974P (or a first set of phosphor reservoir pockets 974P), a second composition ratio "B" of the distinct types of phosphor particles may be placed in a second phosphor reservoir pocket 974P (or a second set of phosphor reservoir pockets 974P), and so on for additional composition ratios, if desired, until all desired phosphor reservoir pockets 974P are loaded with a desired composition ratio of phosphor particles.

As another step in fabrication, the flat smooth surface FABSURF of the fabrication plate FAB may be positioned against the flat fabrication plate shoulder 978A and the pocket dividing regions PDR, and clamped or bonded in that position during fabrication. In this position, the surface FABSURF is nominally flat, and provides a closed cavity including space above the adhesive binding agent (e.g., the adhesive binding agent 492), and a closed space above the phosphor particles located in each of the individual phosphor reservoir pockets 974P. As shown in FIG. 9B, proximate to the phosphor track support shoulder portions 910-P provided by the bottom of the phosphor reservoir pockets 974P, the cavity has a thickness dimension T corresponding to the distance that the phosphor track support shoulder 910-P is recessed from the surface of fabrication plate shoulder 978A.

As another step in fabrication, with the various elements configured as outlined above, the substrate 970 may be spun around its central axis (e.g., the rotation axis 207, shown in FIG. 9B) at a high speed, such that the adhesive binding agent and the various phosphor compositions flow towards the outer ends of the individual phosphor reservoir pockets 974P. The spinning may be maintained until the phosphor particles are tightly packed against the surface FABSURF and the walls of the individual phosphor reservoir pockets 974P to form the tightly packed particle arrangement 496, approximately as shown in FIG. 9B, and the adhesive binding agent permeates substantially all the spaces between the phosphor particles and is cured interspersed with the particles to bind them in place.

FIG. 9B shows that as a result of the fabrication steps outlined above, a phosphor region 210'-5 is formed including an operational track region 210-5, wherein the phosphor particles in the operational track region 210-5 are arranged in tightly packed particle arrangements 496 in each of the phosphor reservoir pockets 974P, which provides a flat operational surface OS comprising the individual operational surface portions "OS-X" (e.g., repeated sets of operational surface portion OS-A through OS-H), arranged along the circular operational track region 210-5. Because the operational surface portions OS-X were/are fabricated by forcing the phosphor particles in the tightly packed particle arrangements 496 to conform to the surface FABSURF as outlined above, the operational surface portions OS-X conformed/conform to the surface FABSURF and are individually and collectively nominally flat and smooth. If the surface FABSURF is not sufficiently flat and/or smooth to provide a desired flatness and/or smoothness of the operational surface OS, or if it simply provides a more convenient or reliable fabrication method, after a tightly packed particle arrangement is achieved in the vicinity of the operational track region, the operational surface OS (and the pocket dividing regions PDR) may be machined (e.g., turned, ground, or lapped, or the like) to provide a desired flatness and/or smoothness. Because the operational surface OS is machined as a surface after the tightly packed particle arrangement is achieved, adjacent to (e.g., interior to) the operational surface OS, the tightly packed particle arrangement is substantially similar to a packing arrangement that would be provided by forcing the phosphor particles against one another in the vicinity of the operational track region.

In one particular embodiment, the phosphor reservoir pockets 974P may have a dimension of approximately 300 um perpendicular to the radial direction. It should be appreciated that various wavelengths or combinations of wavelengths may be output from the phosphor point source element 202-5, depending on the control and synchronization of power in the applied illuminated spot. For example, an applicable method of control and synchronization of power is outlined with reference to FIGS. 7A and 7B in the incorporated '779 Publication.

The embodiments outlined above provide examples where the operational surface of a phosphor point source element may be formed by molding the operational surface at or near the desired degree of flatness by using a flat fabrication plate or window element as a forming element that provides a closed cavity in combination with a substrate of the phosphor point source element. The closed cavity has at least one forming wall, that is, a surface against which the phosphor particles may be forced, in order to force them into a tightly packed particle arrangement. The operational surface may be molded against a flat surface of the fabrication plate or window element. Optionally, if a binding agent is used, flatness of the operational surface may be enhanced by machining (e.g., milling, turning, grinding, or lapping) the operational surface. In contrast, the embodiments outlined below provide examples where the flatness of the operational surface of a phosphor point source element is provided primarily by machining the operational surface. Prior to machining, in various embodiments, a forming element provides either an open or a closed cavity in combination with a substrate of the phosphor point source element. As in previous embodiments, the cavity has at least one forming wall, that is, a surface against which the phosphor particles may be forced, in order to force them into a tightly packed particle arrangement. The tightly packed particle arrangement is formed, and the operational surface is then provided with a desired degree of flatness by machining (e.g., milling, turning, grinding, or lapping) the tightly packed particle arrangement to provide the operational surface. In some embodiments, the forming element may be integral with the substrate, and the forming element may be machined away by the machining operations that form the nominally flat operational surface.

FIGS. 10A, 10B, and 10C are perspective diagrams illustrating how phosphor is arranged in a tightly packed particle arrangement in a sixth embodiment of a phosphor point source element 202-6. FIGS. 10A, 10B, and 10C show only an angular segment of the substrate 1070. It will be understood that the features of the angular segment shown in FIGS. 10A, 10B, and 10C may continue, to extend 360 degrees to form the complete disk-shaped phosphor point source element 202-6. The phosphor point source element 202-6 of FIGS. 10A, 10B, and 10C is similar to the phosphor point source element 202-5 of FIGS. 9A and 9B in that the phosphor reservoir comprises individual phosphor reservoir pockets 1074P separated by radially extending pocket dividing regions PDR, and the individual phosphor reservoir pockets 1074P may be individually loaded with different composition ratios of distinct types of phosphor particles fabricated to provide individual operational surface portions arranged along a circular operational track region 210-6. However, the individual phosphor reservoir pockets are loaded with phosphor particles and formed in a different fashion than that of 210-5, as described below.

As shown in FIG. 10A, a substrate 1070 may be mated to a forming element FE-6 in order to form cavities that receive an adhesive binding agent and phosphor particles. In the embodiment shown in FIG. 10A, the substrate 1070 includes recessed rectangular reservoir pockets 1074 and adjacent dividers near its outer diameter OD, and the forming element FE-6 includes recesses that match the reservoir pockets 1074. In one exemplary method of fabrication, the adhesive binding 492 is mixed with a first composition ratio "A" of distinct types of phosphor particles 495 and the resulting mixture is loaded into a cavity corresponding to the first phosphor reservoir pocket 1074P (or a first set of phosphor reservoir pockets 1074P), and so on for additional composition ratios, if desired, until all desired cavities are loaded with a desired composition ratio of phosphor particles. In one embodiment, each phosphor particle mixture is loaded into its corresponding cavity through the illustrated cavity opening at the outer diameter OD, and each cavity opening is then sealed using a sealing element 1097, shown in dashed outline in FIG. 10B. The sealing element 1097 (e.g., adhesive metal tape, in one embodiment), which may be regarded as a forming element in some embodiments, restrains the phosphor particles within each cavity, and may close the cavity and provide a forming wall in some embodiments (e.g., during spinning to form a tightly packed particle arrangement, as outlined below with respect to FIG. 10B).

As shown in FIG. 10B, with the various elements configured as outlined above, the assembly of the forming element(s), and mixtures, and the substrate 1070 may be spun around its central axis at a high speed, such that the adhesive binding agent and the various phosphor compositions flow towards the outer ends of the cavities corresponding to the individual phosphor reservoir pockets 1074P. Spinning forces the phosphor particles against the sealing element 1097 and other cavity walls to provide a tightly packed particle arrangement 496. The spinning may be maintained until the phosphor particles form the tightly packed particle arrangement 496, approximately as shown in FIG. 10B, and the adhesive binding agent permeates between the phosphor particles and is cured to bind them in place. The forming element FE-6 and the sealing element 1097 may then be removed, leaving the fixed tightly packed particle arrangement(s) 496 bonded to the substrate 1070 by their binding agent, and extending above their corresponding phosphor reservoir pockets 1074P, due to the recesses in the forming element FE-6.

As shown in FIG. 10C, the resulting formations of the tightly packed particle arrangement 496 are then machined to provide the operational surface OS (e.g., comprising the portions OS-A', OS-B', OS-C', OS-D' and OS-E') such that the operational surface OS is nominally flat along the operational track region 210-6. FIG. 10C shows that as a result of the fabrication steps outlined above, a phosphor region 210'-6 is formed including an operational track region 210-6, wherein the phosphor particles in the operational track region 210-6 are arranged in a tightly packed particle arrangement 496 (e.g., in each of the phosphor reservoir pockets 1074P), which provides the flat operational surface OS comprising the individual operational surface portions, arranged along the circular operational track region 210-6. In the embodiment shown in FIG. 10C, the operational surface OS comprises a nominally flat machined surface of the tightly packed particle arrangement 496. Additional embodiments wherein the operational surface comprises a machined surface of a tightly packed particle arrangement are described below.

FIGS. 11A, 11B, 11C, and 11D are perspective diagrams illustrating how phosphor is arranged in a tightly packed particle arrangement in an angular segment of a seventh embodiment of a phosphor point source element 202-7. The phosphor point source element 202-7 of FIGS. 11A, 11B, 11C, and 11D is similar to the phosphor point source element 202-6 of FIGS. 10A-10C in some ways, and similar elements in FIGS. 10 and 11 are similarly numbered (for example, substrate 1070 and substrate 1170 indicate similar elements). The phosphor point source element 202-7 may be understood in large part by analogy with the phosphor point source element 202-6. In particular, in one embodiment, FIG. 11A may be understood to represent elements, assembly, and fabrication operations similar or identical to those represented by FIG. 10B. After the adhesive binding agent is cured and binds the tightly packed particle arrangement(s) 496 in place, the forming element FE-7 and any sealing element used prior to curing may be removed, leaving the tightly packed particle arrangement(s) 496 bonded to the substrate 1170 by their binding agent, and extending above their corresponding phosphor reservoir pockets 1174P, due to the recesses in the forming element FE-7. The phosphor point source element 202-7 then is formed by fabrication steps that provide additional features described below.

As shown in FIG. 11B, with the various elements configured as outlined above, a sealing element 1197 (which may be regarded as a forming element not shown in FIG. 11B) may be applied, and an additional mixture of a distinct type of phosphor particles 495' and adhesive binding agent may be deposited in the resulting open cavity, on top of and in between the cured tightly packed particle arrangement(s) 496. A forming element FE-7' may be fixed atop the mixture 495' to form a closed cavity, if desired.

As shown in FIG. 11C, with the various elements configured as outlined above, the assembly of the forming element (s), and mixtures, and the substrate 1170 is spun around its central axis at a high speed for a second time, such that the adhesive binding agent and the phosphor mixture 495' flows towards the outer diameter OD of the substrate 1170. Spinning forces the phosphor particles in the mixture 495' against the sealing element 1197 and the forming element FE-7'. The spinning may be maintained until the phosphor particles form the tightly packed particle arrangement 496', approximately as shown in FIG. 11C, and the adhesive binding agent permeates between the phosphor particles and is cured to bind them in place. The forming element FE-7' and the sealing element 1197 may then be removed, leaving the fixed tightly packed particle arrangement 496' bonded to the tightly packed particle arrangement(s) 496 and the substrate 1170 by the binding agent.

As shown in FIG. 11D, the resulting formation of the tightly packed particle arrangements 496 and 496' are then machined to provide the operational surface OS (e.g., comprising the operational surface portions OS-A", OS-B", OS-C", OS-D", OS-E", and OS-F") such that the operational surface OS is nominally flat along the operational track region 210-7. FIG. 11D shows that as a result of the fabrication steps outlined above, a phosphor region 210'-7 is formed including an operational track region 210-7, wherein the phosphor particles in the operational track region 210-7 are arranged in tightly packed particle arrangements 496 (e.g., in each of the phosphor reservoir pockets 1174P) and 496' (e.g., in between the tightly packed particle arrangements 496), which provides the flat operational surface OS comprising the individual operational surface portions arranged along the circular operational track region 210-7. In contrast with the phosphor point source element 202-6, wherein the operational surface OS is interrupted by pocket dividing regions PDR between the phosphor reservoir pockets 1174P, the operational surface OS of the phosphor point source element 202-7 comprises a continuum of phosphor sub-regions and operational surface portions corresponding to phosphor sub-regions. In some embodiments, it may be desirable for the operational surface portions OS-F" to be narrower along than the operational surface portions OS-A", OS-B", OS-C", OS-D", and OS-E", because the operational surface portions OS-F" are repeated more frequently than the other operational surface portions, and may contribute intensity at the wavelengths corresponding to their particular shared phosphor mixture more frequently as the phosphor point source element 202-7 rotates. In alternative embodiments, instead of the single phosphor mixture 495', a different phosphor mixture may be loaded into cavities between each of the cured tightly packed particle arrangements 496, and the forming operations described with reference to FIGS. 11B-11D will then produce different phosphor wavelengths in the resulting individual tightly packed particle arrangements 496' shown in FIG. 11D.

In the embodiments described above, closed cavities have been provided for the phosphor mixtures prior to spinning and curing. An open cavity fabrication configuration is described below.

Figure 12A:
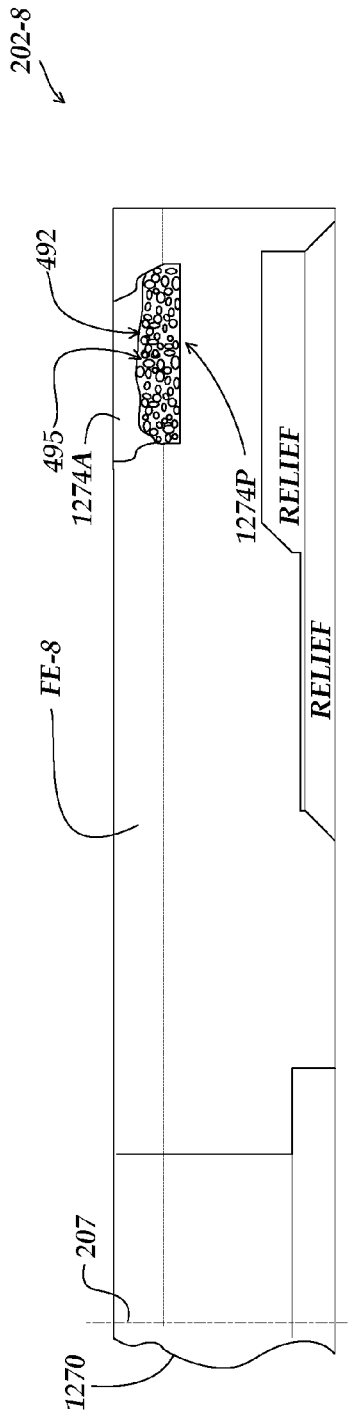
FIGS. 12A, 12B and 12C are cross-section diagrams illustrating how phosphor is arranged in a tightly packed particle arrangement in an eighth embodiment of a phosphor point source element.
Figure 12B:
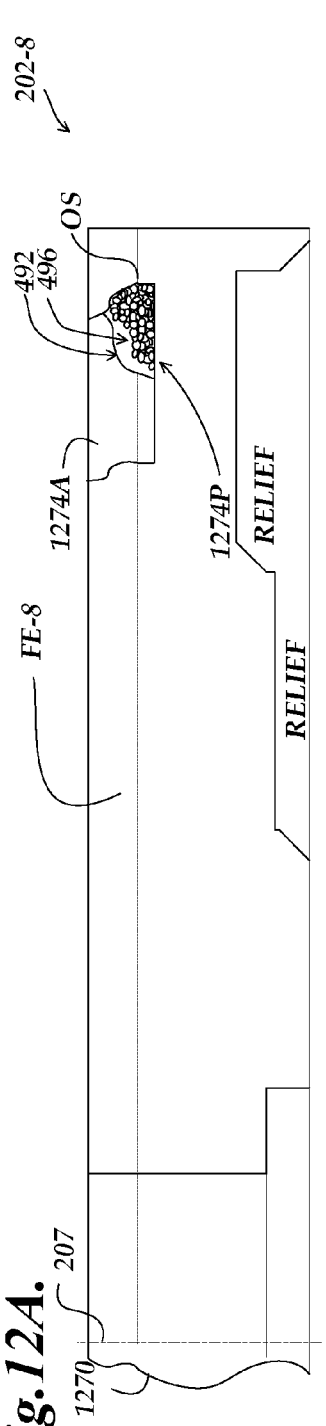
Figure 12C:
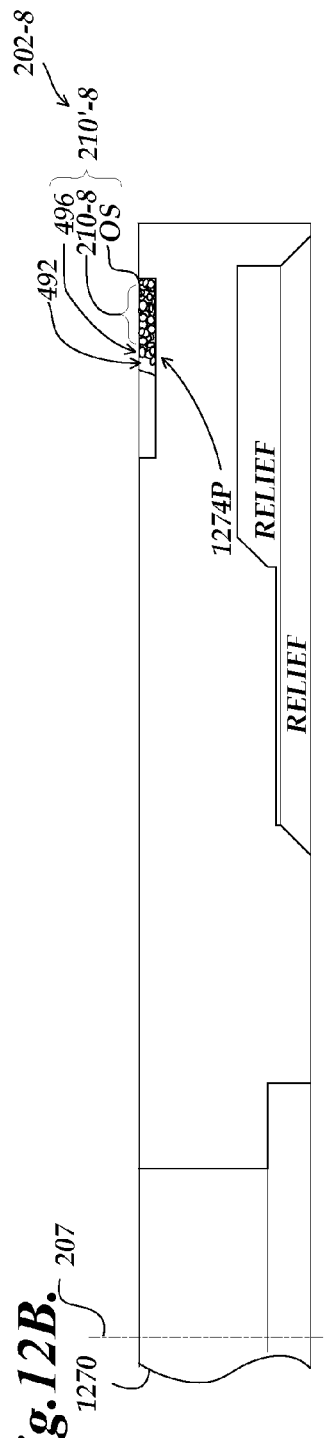

FIGS. 12A, 12B, and 12C are cross-section diagrams illustrating how phosphor is arranged in a tightly packed particle arrangement 496, as fabricated in an open cavity in an eighth embodiment of a phosphor point source element 202-8. In one embodiment, the cross-section of the phosphor point source element 202-8 of FIGS. 12A, 12B, and 12C may be regarded as the cross-section of an open annular reservoir or cavity or, in another embodiment, as the cross-section of one of a number of individual pockets of different types of phosphor particles arranged along a circular operational track region. In the latter case, the phosphor point source element 202-8 may be analogous to the phosphor point source element 202-5 in that a phosphor reservoir comprises individual phosphor reservoir pockets (e.g., pocket 1274P in the substrate 1270) separated by radially extending pocket dividing regions, and individual phosphor reservoir cavities comprising phosphor reservoir pockets 1274P may be loaded with different composition ratios of phosphor particles and fabricated to provide individual operational surface portions arranged along a circular operational track region. However, the individual phosphor reservoir cavities may comprise open cavities in the present embodiment.

As shown in FIG. 12A, a substrate 1270 may be mated to (e.g., by clamping or bonding two elements), or formed integrally with (e.g., using a single piece of machined and/or molded or stereolithographically-formed material), a forming element FE-8, in order to form a reservoir comprising an open cavity or cavities 1274A that receive a mixture comprising an adhesive binding agent 492 and phosphor particles 495. In the embodiment shown in FIG. 12A, the substrate 1270 may include recessed rectangular reservoir pockets 1274P and the forming element FE-8 may include walled openings that match the reservoir pockets 1274P. In one embodiment, as shown in FIGS. 12A and 12B, the forming element FE-8 may include forming walls that contain the phosphor mixture during fabrication.

In one exemplary method of fabrication, the mixture of the adhesive binding agent 492 and phosphor particles 495 is loaded in the open cavity 1274A, and so on for additional composition ratios in additional individual cavities, if desired.

As shown in FIG. 12B, with the various elements configured as outlined above, the assembly of the forming element FE-8, and mixture(s), and the substrate 1270 may be spun around its central axis (e.g., the rotation axis 207, shown in FIG. 12B) at a high speed, such that in each cavity 1274A the adhesive binding agent 492 and the phosphor composition 495 flows towards the outer wall, which may be regarded as an outer forming wall OFW. Spinning forces the phosphor particles against the walls of the cavity 1274A to provide a tightly packed particle arrangement 496. In the illustrated embodiment, the radially outer forming wall OFW of the cavity is slanted inwards, to prevent the phosphor mixture from climbing the wall and overflowing the open cavity during spinning operations. The spinning may be maintained until the phosphor particles form the tightly packed particle arrangement 496, approximately as shown in FIG. 12B, and the adhesive binding agent 492 permeates between the phosphor particles and is cured to bind them in place and to the substrate 1270.

As shown in FIG. 12C, the resulting formation of the tightly packed particle arrangement(s) 496 is then machined, at least in the vicinity of the operational surface OS, such that the forming element FE-8 is removed and the tightly packed particle arrangement 496 is machined to be nominally flat along the operational surface OS in the operational track region 210-8. FIG. 12C shows that as a result of the fabrication steps outlined above, a phosphor region 210'-8 is formed including an operational track region 210-8, wherein the phosphor particles in the operational track region 210-8 are each arranged in a tightly packed particle arrangement 496 (e.g., in each of the phosphor reservoir pockets 1274P), which provides a flat operational surface OS comprising the individual operational surface portions arranged along the circular operational track region 210-8. As indicated previously, a continuous annular phosphor operational surface OS, rather than individual operational surface portions, may be fabricated by a method analogous to that outlined above, if desired.

Figure 13:
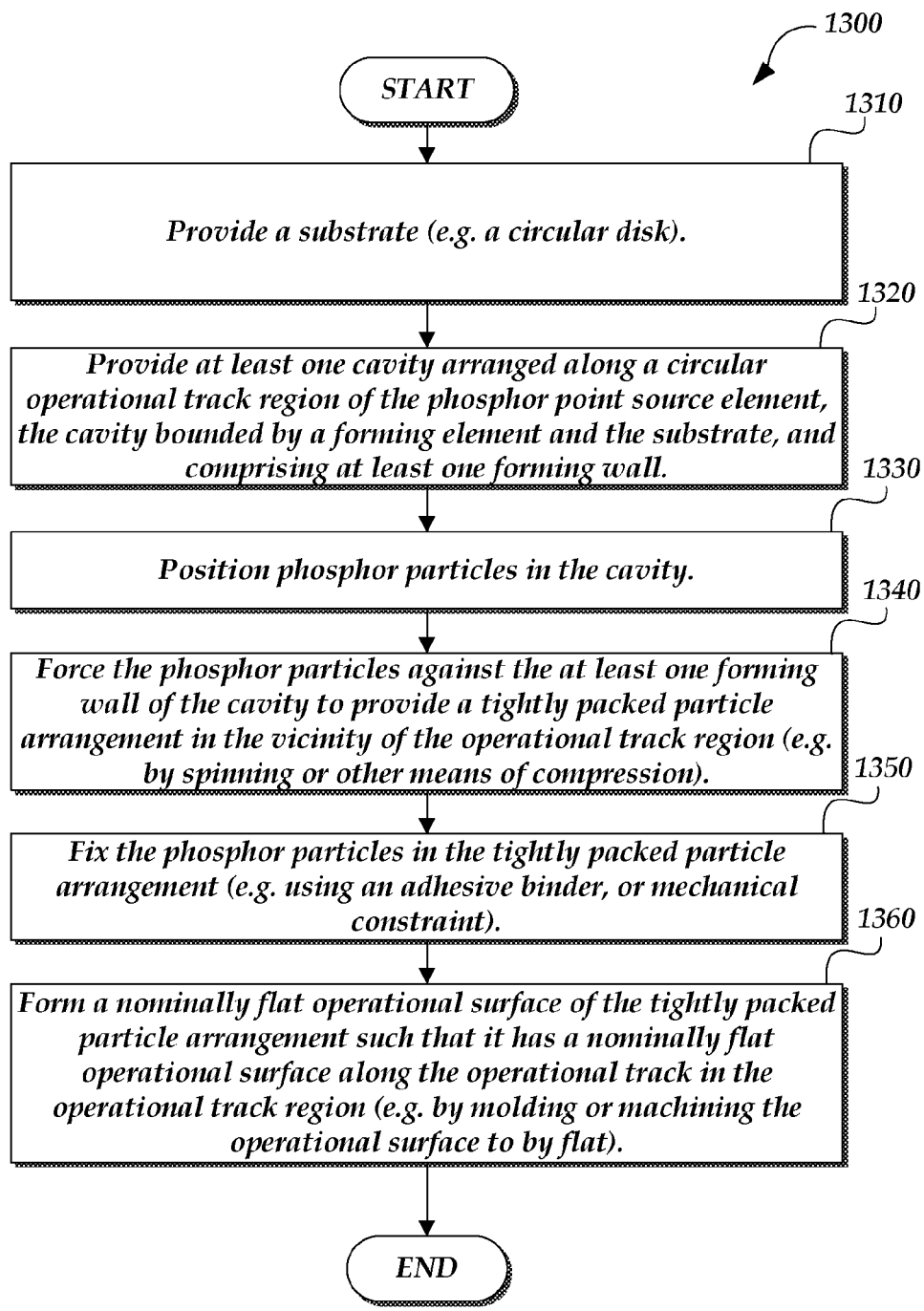
FIG. 13 is a flow diagram illustrating an exemplary method for forming a phosphor point source element.

FIG. 13 is a flow diagram illustrating an exemplary general method 1300 for forming a phosphor point source element. At a block 1310, a substrate is provided. As described above, in one specific example implementation, the substrate may comprise a circular disk (e.g., a metal disk) that may have one or more circular reservoirs for receiving phosphor particles (and a binding agent if one is used), or it may include individual phosphor composition pockets arranged along an annular track. At a block 1320, at least one cavity is provided which is arranged along a circular operational track region of the phosphor point source element, the cavity bounded by a forming element and the substrate, and comprising at least one forming wall. In some embodiments, the forming element may comprise a fabrication plate which may be a nominally flat, smooth plate made of any desired material (e.g., a clear glass window, metal, etc.). In some embodiments, the forming element may comprise recesses or open portions for loading phosphors and the cavity may extend above a desired final plane of an operational surface.

At a block 1330, phosphor particles are positioned in the cavity. As described above, in certain embodiments this may comprise placing the phosphor particles (and binding agent if one is used) in one or more reservoirs in a substrate, and subsequently positioning a forming element in a fixed relationship relative to the substrate (e.g., against a fabrication plate shoulder arranged at a desired location relative to other features on the substrate, as outlined above). In other embodiments, this may comprise placing the phosphor particles in a cavity already formed between the forming element and the substrate, and then closing or sealing the cavity using a sealing element. In other embodiments, this may comprise placing the phosphor particles in an open cavity formed by the forming element and the substrate.

At a block 1340, the phosphor particles are forced against the at least one forming wall of the cavity to provide a tightly packed particle arrangement in the vicinity of the operational track region. As described above, one technique for achieving the desired compression is to utilize reactive centrifugal force by spinning the substrate, the forming element and the phosphor particles at a sufficient rate (e.g., 1,000 to 40,000 rpm) so as to cause the desired tightly packed particle arrangement, wherein the spinning forces the phosphor particles against the at least one forming wall and provides forces sufficient to achieve the tightly packed particle arrangement. In other embodiments, other compression techniques may be utilized, such as mechanical compression, etc.

At a block 1350, the phosphor particles are fixed in the tightly packed particle arrangement. In some embodiments, if a liquid binding agent was utilized during the process, then the liquid binding agent is provided in the cavity prior to spinning, and allowed to harden (e.g., to cure) during and/or after spinning. In some embodiments, the forming element is removed after the phosphor particles are fixed in the tightly packed particle arrangement. As described above, in an embodiment where the forming element is to be removed, an inhibitor may be used on the forming element so that the binding agent does not bond to the forming element. In some embodiments (e.g., where a liquid binding agent was not utilized), the forming element may generally comprise a transparent fabrication plate, which is left in place to support, protect, and/or retain the tightly packed particle arrangement.

At a block 1360, the tightly packed particle arrangement is formed such that it has a nominally flat operational surface along the operational track in the operational track region. In some embodiments, this may comprise machining the operational surface of the fixed tightly packed particle arrangement such that it is nominally flat. In other embodiments, this may comprise molding the fixed tightly packed particle arrangement against a flat forming wall, such that the corresponding molded surface provides the nominally flat operational surface. In other embodiments, this may comprise permanently compressing the tightly packed particle arrangement against a flat forming wall (e.g., a window), such that the corresponding compressed surface provides the nominally flat operational surface.

Figure 14A:
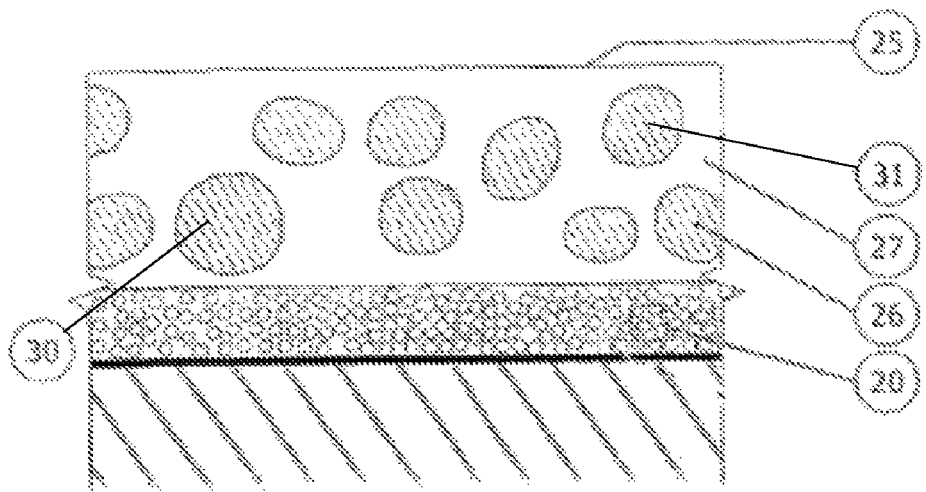
FIGS. 14A and 14B are cross-section diagrams illustrating an undesirable particle arrangement in a phosphor layer formed in accordance with a prior art technique.
Figure 14B:
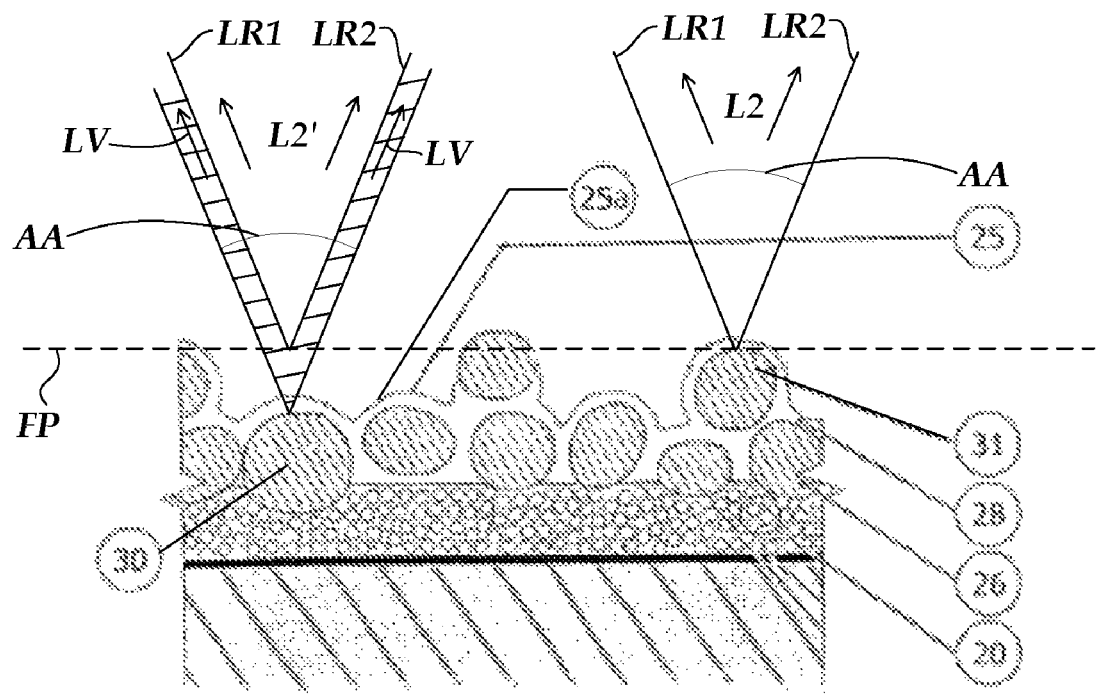

FIGS. 14A and 14B are cross-section diagrams illustrating a particle arrangement in a phosphor layer formed in accordance with a prior art technique, as also illustrated in FIGS. 3C and 3D of U.S. Pat. No. 7,354,785. FIG. 14A illustrates phosphor particles 26 suspended in a wet polymer solvent composition 27, and arranged in a generally random fashion. A phosphor ink of a light emitting layer 25 is deposited in one or in multiple layers by screen printing, bar coating, or a variety of film applicators. Details regarding an insulating layer 20 are not relevant to the present discussion. An example of a technique for laying down the light emitting layer is described in the '789 patent as follows. The ink is made from CR-S 10% and CR-u 1.1%, DMF 33.3%, and GG43 55.55% by weight. This is applied by a film applicator (Bird Applicator from Braive Instruments) technique to the insulating layer in a wet thickness of approximately 80-110 microns. After application, the substrates are removed from the printer and dried.

FIG. 14B shows the light emitting layer after low temperature drying, where the majority of the solvent has evaporated, leaving a reduced volume dry binder 28. The top surface 25a of the light emitting layer 25 is shown to be uneven after the initial low temperature drying. The extent of the unevenness of the light emitting layer after low temperature drying is determined by several factors, including the amount of phosphor particles to resin.

FIG. 14B also shows a focal plane FP, which may correspond to the focal plane FP shown in FIG. 2, which may be the focal plane FP of the elements of the input light path optical element set 219, or the focal plane FP of the elements of the output optical path 222, or both, as illustrated in FIG. 2. As schematically shown in FIG. 14B, for points on the surface of a phosphor particle that are proximate to the focal plane FP (e.g., as shown for the phosphor particle 31) light rays emitted within the acceptance angle AA of the elements of the output optical path (e.g., the output optical path 222) will be input to the output optical path, for example as illustrated for the light L2 between the limiting rays LR1 and LR2 of the output optical path. In contrast, for points on the surface of a phosphor particle that are not proximate to the focal plane FP (e.g., as shown for the phosphor particle 30), some of the light emitted within the same acceptance angle AA of the elements of the output optical path will not be input to the output optical path, for example as illustrated for the light LV shown in the cross-hatched regions outside the limiting rays LR1 and LR2 of the output optical path. Thus, the proportion of light that is actually output from a point on a phosphor particle through a focused output optical path depends on the distance of that point from the focal plane FP of that optical output path (e.g., the intensity of the light L2 is not the same as the intensity of the light L2'). It will be appreciated that some light sources may exhibit a very high sensitivity to such deviations from the focal plane FP. For example, in one exemplary embodiment of the light source shown in FIG. 2, the depth of field of the output optical path 220 when collecting light into a 50 um fiber may be approximately 20 um, suggesting that particle deviations of 20 um from the focal plane FP may cause significant intensity changes. It should be appreciated that the dimensions of the light emitting phosphor particles may be on the order of 20 microns, in some embodiments. Accordingly, for at least these reasons, an "uneven" phosphor surface fabricated by prior art methods, such as shown in FIG. 14B, may contribute to significant output intensity variations as it moves in a light source that uses a focused output optical path, such as that shown in FIG. 2. It should be appreciated that if the input optical path of a light source is also focused at the focal plane FP, that size and average intensity within of the resulting illuminated spot (e.g., the illuminated spot 224 shown in FIG. 2) will vary depending on the distance of the illuminated phosphor surface from the focal plane, which may also contribute to output intensity variations in "uneven" phosphor surfaces fabricated by prior art methods.

In contrast to the prior art phosphor surface fabrication technique of the '785 patent as illustrated in FIGS. 14A and 14B, in accordance with various embodiments disclosed and claimed herein, a flat operational surface OS of a tightly packed phosphor particle arrangement 496 is achieved. Such a flat operational surface of tightly packed particles allows the surface to be rotated through the illuminated spot 224 without significant changes in the distance between a succession of excited phosphor particles and a focal plane of the input and/or output optical path. Thus, in contrast to phosphor plates fabricated by previously known methods, a phosphor element having a flat operational surface as disclosed and claimed herein may provide a more stable output intensity when used in a light source such as that shown in FIG. 2.

While various exemplary embodiments of the present invention have been illustrated and described, numerous variations in the illustrated and described arrangements of features and sequences of operations will be apparent to one skilled in the art based on this disclosure. For example, the shape and/or configuration of the phosphor point source element 202 is not limited to a wheel-type configuration that rotates around an axis, and may include any other shape that may rotate around an axis and/or any other shape that may be displaced linearly (e.g., a reciprocating phosphor point source element) relative to an input and output light location. Furthermore, it will be appreciated that the various exemplary dimensions outlined previously are particularly suitable for systems which benefit from small optical fiber diameters, compact construction and very short pulse durations. However, it will be appreciated that other systems may use dimensions other than those outlined above. Thus, it will be appreciated that various changes according to the teachings herein can be made to the various particular embodiments outlined above without departing from the spirit and scope of the invention.

The embodiments of the invention in which an exclusive property or privilege is claimed are defined as follows:

1. A phosphor point source element that is rotated to provide a high intensity point source of phosphor radiation from an operational track on the phosphor point source element, the phosphor point source element comprising:
    a substrate; and
    a light emitting phosphor supported by the substrate, and arranged in a circular operational track region on the substrate,
    wherein:
        the light emitting phosphor comprises phosphor particles;
        the operational track region comprises an operational surface that can be illuminated to excite the light emitting phosphor;
        the phosphor particles in the operational track region are arranged in a tightly packed particle arrangement fixed in position adjacent to the operational surface; and
        the operational surface comprises a surface of the tightly packed particle arrangement, and is formed such that it is nominally flat, wherein the tightly packed particle arrangement is substantially similar to a packing arrangement that would be provided by forcing the phosphor particles against one another in the vicinity of the operational track region.

2. The phosphor point source element of claim 1, wherein the tightly packed particle arrangement comprises a binding agent that is interspersed with the phosphor particles and binds them to one another.

3. The phosphor point source element of claim 2, wherein the operational surface comprises a machined surface of the tightly packed particle arrangement.

4. The phosphor point source element of claim 2, wherein the operational surface comprises a molded surface of the tightly packed particle arrangement.

5. The phosphor point source element of claim 1, wherein the operational track region has a nominal thickness dimension T defined between the operational surface and the substrate, and the phosphor particles occupy at least 75% of the volume of the operational track region.

6. The phosphor point source element of claim 5, wherein T is at least 100 microns.

7. The phosphor point source element of claim 1, wherein the operational track region has a nominal thickness dimension T defined between the operational surface and the substrate, the phosphor particles in the operational track region each have a maximum dimension, the average maximum dimension in the operational track region is D, and the nominal thickness dimension T is at least N*D, wherein N is at least 2.

8. The phosphor point source element of claim 7, wherein N is at least 4.

9. The phosphor point source element of claim 7, wherein the average maximum dimension D is at most 35 microns.

10. The phosphor point source element of claim 1, wherein the operational surface is flat such that the operational surface fits between ideal parallel planes spaced a dimension F apart, where F is at most 150 microns.

11. The phosphor point source element of claim 10, where F is at most 50 microns.

12. The phosphor point source element of claim 1, wherein:
the operational track region comprises a plurality of phosphor sub-regions arranged along the operational track region;
the phosphor particles comprise a plurality of chemically distinct types of phosphor particles;
in adjacent first and second sub-regions, a first composition ratio comprising one or more of the chemically distinct types of phosphor particles is provided in the first sub-region, a second composition ratio comprising one or more of the chemically distinct types of phosphor particles is provided in the second sub-region, and the first and second composition ratios are different.

13. The phosphor point source element of claim 12, wherein:
the operational surface is interrupted by pocket dividing regions between the phosphor sub-regions, and comprises operational surface portions corresponding to the phosphor holding sub-regions.

14. The phosphor point source element of claim 12, wherein:
the operational surface comprises a continuum of phosphor sub-regions and operational surface portions corresponding to the phosphor sub-regions.

15. The phosphor point source element of claim 1, further comprising a window element that includes a planar surface, wherein the window element is arranged in a fixed relationship relative to the substrate such that the planar surface is arranged at a desired location of the operational surface.

16. A method for forming a phosphor point source element which is rotated to provide a high intensity point source of phosphor radiation from an operational track on the phosphor point source element, the phosphor point source element comprising a substrate and a light emitting phosphor comprising phosphor particles, the method comprising:
providing the substrate of the phosphor point source element;
providing at least one cavity arranged along a circular operational track region of the phosphor point source element, the cavity bounded by a forming element and the substrate, and comprising at least one forming wall;
positioning phosphor particles in the cavity;
forcing the phosphor particles against the at least one forming wall of the cavity to provide a tightly packed particle arrangement in the vicinity of the operational track region;
fixing the phosphor particles in the tightly packed particle arrangement; and
forming the tightly packed particle arrangement such that it has a nominally flat operational surface along the operational track in the operational track region.

17. The method of claim 16, wherein forcing the phosphor particles against the forming wall comprises utilizing forces created by spinning the substrate, the forming element, and the phosphor particles, wherein the spinning forces the phosphor particles against the at least one forming wall and provides forces sufficient to achieve the tightly packed particle arrangement.

18. The method of claim 16, wherein forming the tightly packed particle arrangement such that it has a nominally flat operational surface comprises machining the operational surface such that it is nominally flat.

19. The method of claim 16, wherein forming the tightly packed particle arrangement such that it has a nominally flat operational surface comprises molding the tightly packed particle arrangement against a flat forming wall, and then fixing the phosphor particles in the tightly packed particle arrangement, such that the corresponding molded surface provides the nominally flat operational surface.

* * * * *